US012718564B2

(12) United States Patent
Dvornik et al.

(10) Patent No.: US 12,718,564 B2
(45) Date of Patent: Aug. 25, 2026

(54) STEP DISCOVERY AND LOCALIZATION IN INSTRUCTIONAL VIDEOS USING A SELF-SUPERVISED TRANSFORMER

(71) Applicant: SAMSUNG ELECTRONICS CO., LTD., Suwon-si (KR)

(72) Inventors: Mikita Dvornik, Toronto (CA); Isma Hadji, London (GB); Ran Zhang, Toronto (CA); Konstantinos Derpanis, Toronto (CA); Richard Wildes, Toronto (CA); Animesh Garg, Redmond, WA (US); Allan Douglas Jepson, Oakville (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 377 days.

(21) Appl. No.: 18/227,560

(22) Filed: Jul. 28, 2023

(65) Prior Publication Data

US 2024/0169732 A1 May 23, 2024

Related U.S. Application Data

(60) Provisional application No. 63/427,289, filed on Nov. 22, 2022.

(51) Int. Cl.
*G06V 20/40* (2022.01)
*G06F 16/735* (2019.01)
(Continued)

(52) U.S. Cl.
CPC ............ *G06V 20/46* (2022.01); *G06F 16/735* (2019.01); *G06F 16/7844* (2019.01);
(Continued)

(58) Field of Classification Search
None
See application file for complete search history.

(56) References Cited

U.S. PATENT DOCUMENTS 10,628,518 B1 * 4/2020 Francois .............. G11B 27/327
10,867,183 B2 12/2020 Shetty et al.
(Continued)

OTHER PUBLICATIONS

Lin et al., "Learning To Recognize Procedural Activities with Distant Supervision." arXiv preprint arXiv:2201.10990 (2022). (Year: 2022).*
(Continued)

*Primary Examiner* — John B Strege
(74) *Attorney, Agent, or Firm* — Sughrue Mion, PLLC

(57) ABSTRACT

The present disclosure provides methods, apparatuses, and computer-readable media for step discovery and localization in an instructional video. In some embodiments, the method includes extracting, from the instructional video using a transformer model, a plurality of step slots corresponding to a plurality of procedure steps depicted in the instructional video, matching, using an order-aware sequence-to-sequence alignment model, a plurality of video segments of the instructional video to the plurality of step slots, generating a temporally-ordered plurality of video segments from the plurality of video segments, receiving a user query requesting a procedure step, selecting, from the plurality of video segments of the instructional video, a corresponding video segment corresponding to the requested procedure step, and providing, in response to the user query, the corresponding video segment and the matching textual step description of the corresponding video segment.

18 Claims, 10 Drawing Sheets

(51) Int. Cl.

| | |
|---|---|
| ***G06F 16/783*** | (2019.01) |
| ***G06F 18/22*** | (2023.01) |
| ***G06V 10/77*** | (2022.01) |
| ***G06V 10/82*** | (2022.01) |
| ***G06V 10/86*** | (2022.01) |
| ***G09B 5/06*** | (2006.01) |

(52) U.S. Cl.

CPC .......... *G06F 18/22* (2023.01); *G06V 10/7715* (2022.01); *G06V 10/82* (2022.01); *G06V 10/86* (2022.01); *G06V 20/41* (2022.01); *G06V 20/48* (2022.01); *G06V 20/49* (2022.01); *G09B 5/065* (2013.01)

(56) References Cited

U.S. PATENT DOCUMENTS

| | | | | |
|---|---|---|---|---|
| 11,386,665 | B2 | 7/2022 | Agarwal et al. | |
| 11,651,591 | B2 * | 5/2023 | Gao | G06F 16/7844 382/103 |
| 11,910,073 | B1 * | 2/2024 | Sharma | H04N 21/8549 |
| 11,989,941 | B2 * | 5/2024 | Li | G06V 10/806 |
| 12,367,662 | B2 * | 7/2025 | Martin-Martin | G06V 10/7753 |
| 12,386,892 | B2 * | 8/2025 | Nasir | G06F 16/71 |
| 2008/0310734 | A1 * | 12/2008 | Ahammad | G06V 20/40 382/209 |
| 2009/0317781 | A1 * | 12/2009 | Oosthuizen | G09B 5/065 434/267 |
| 2020/0272823 | A1 * | 8/2020 | Liu | G06F 18/24317 |
| 2021/0166035 | A1 * | 6/2021 | Shetty | G06V 20/46 |
| 2022/0021950 | A1 * | 1/2022 | Wei | H04N 21/4884 |
| 2022/0327827 | A1 * | 10/2022 | Gao | G06N 20/00 |
| 2023/0154188 | A1 * | 5/2023 | Li | G06V 10/776 382/159 |
| 2023/0392935 | A1 * | 12/2023 | Maggiore | G06F 40/186 |
| 2024/0005663 | A1 * | 1/2024 | Lee | G06V 20/46 |
| 2024/0152553 | A1 * | 5/2024 | Nasir | G06N 3/082 |
| 2024/0161464 | A1 * | 5/2024 | Martin-Martin | G06F 40/30 |
| 2024/0346809 | A1 * | 10/2024 | Guo | G06V 10/776 |
| 2025/0021600 | A1 * | 1/2025 | Park | G06V 20/62 |

OTHER PUBLICATIONS

Dvornik et al., "Drop-DTW: Aligning Common Signal Between Sequences While Dropping Outliers." arXiv preprint arXiv:2108.11996 (2021). (Year: 2021).*

Shen et al., "Learning to Segment Actions from Visual and Language Instructions via Differentiable Weak Sequence Alignment," 2021 IEEE/CVF Conference on Computer Vision and Pattern Recognition (CVPR), Nashville, TN, USA, 2021, pp. 10151-10160 (Year: 2021).*

Carion et al., "End-to-end object detection with transformers." In European conference on computer vision, pp. 213-229. Cham: Springer International Publishing, 2020. (Year: 2020).*

Bertasius et al., "Is space-time attention all you need for video understanding?" in Proc. ICML, vol. 2, No. 3, p. 4, Jul. 2021. (Year: 3032).*

Sun et al., "PlaTe: Visually-Grounded Planning With Transformers in Procedural Tasks," in IEEE Robotics and Automation Letters, vol. 7, No. 2, pp. 4924-4930, Apr. 2022, doi: 10.1109/LRA.2022.3150855. (Year: 2022).*

Zhou et al., "Show me more details: Discovering hierarchies of procedures from semi-structured web data." arXiv preprint arXiv:2203.07264 (2022). (Year: 2022).*

Khan et al., "Transformers in vision: A survey." ACM computing surveys (CSUR) 54, No. 10s (2022): 1-41. (Year: 2022).*

* cited by examiner

INSTRUCTIONAL VIDEO

310

STEP DISCOVERY 320

STEP SLOTS 330

$s_1$ $s_2$ $s_3$ $s_4$ $s_5$ $s_6$ $s_7$ $s_8$

VIDEO STEP SEGMENTATION 340

START $v_1$ END

START $v_2$ END

START $v_3$ END

START $v_4$ END

1000

EXTRACTING, FROM THE INSTRUCTIONAL VIDEO USING A TRANSFORMER MODEL, A PLURALITY OF STEP SLOTS CORRESPONDING TO A PLURALITY OF PROCEDURE STEPS DEPICTED IN THE INSTRUCTIONAL VIDEO — 1010

MATCHING, USING AN ORDER-AWARE SEQUENCE-TO-SEQUENCE ALIGNMENT MODEL, A PLURALITY OF VIDEO SEGMENTS OF THE INSTRUCTIONAL VIDEO TO THE PLURALITY OF STEP SLOTS — 1020

GENERATING A TEMPORALLY-ORDERED PLURALITY OF VIDEO SEGMENTS FROM THE PLURALITY OF VIDEO SEGMENTS, EACH VIDEO SEGMENT OF THE TEMPORALLY-ORDERED PLURALITY OF VIDEO SEGMENTS HAVING A MATCHING TEXTUAL STEP DESCRIPTION — 1030

RECEIVING A USER QUERY REQUESTING A PROCEDURE STEP — 1040

SELECTING, FROM THE PLURALITY OF VIDEO SEGMENTS OF THE INSTRUCTIONAL VIDEO, A CORRESPONDING VIDEO SEGMENT CORRESPONDING TO THE REQUESTED PROCEDURE STEP — 1050

PROVIDING, IN RESPONSE TO THE USER QUERY, THE CORRESPONDING VIDEO SEGMENT AND THE MATCHING TEXTUAL STEP DESCRIPTION OF THE CORRESPONDING VIDEO SEGMENT — 1060

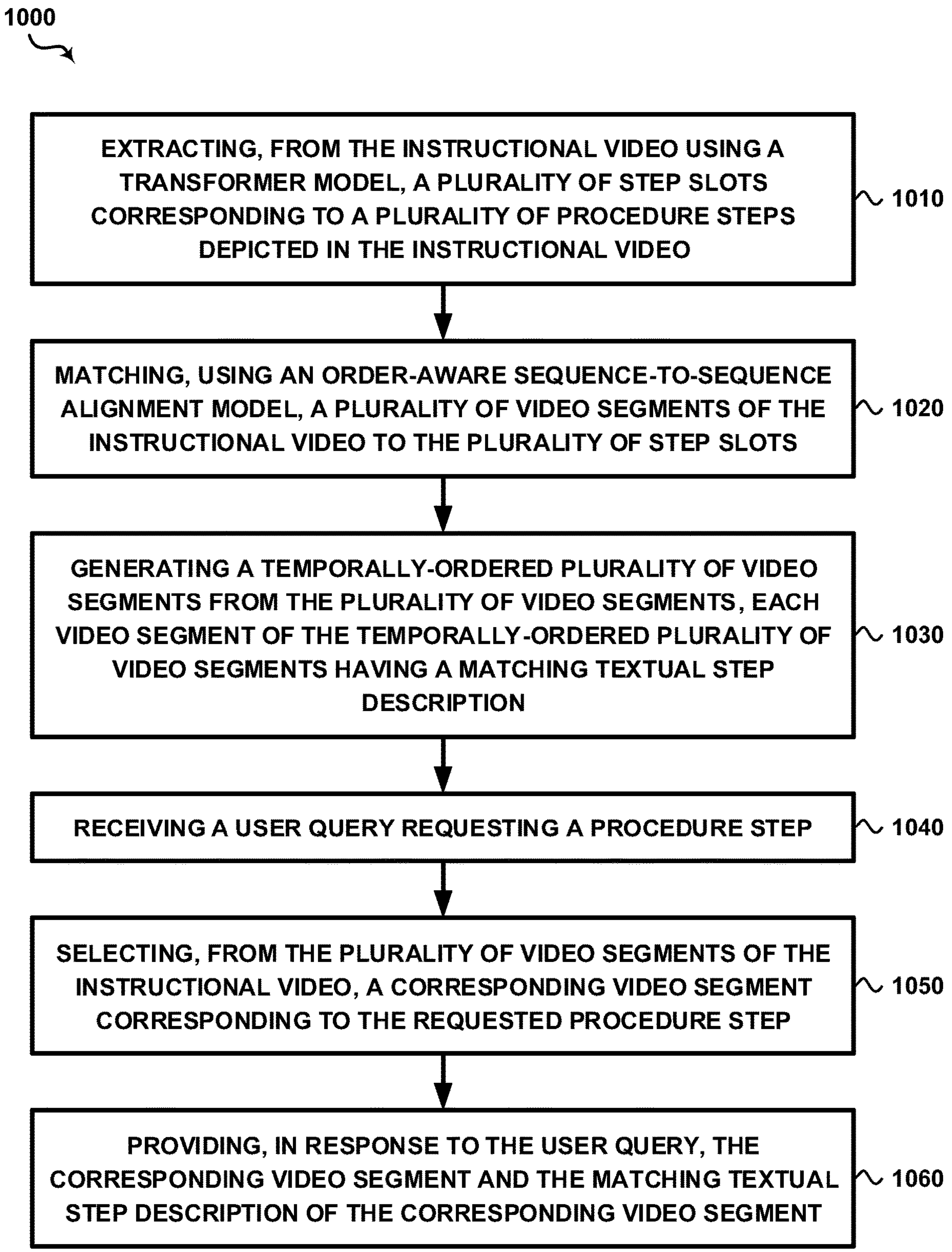

FIG. 10

STEP DISCOVERY AND LOCALIZATION IN INSTRUCTIONAL VIDEOS USING A SELF-SUPERVISED TRANSFORMER

CROSS-REFERENCE TO RELATED APPLICATIONS

This application claims benefit of priority under 35 U.S.C. § 119 to U.S. Provisional Patent Application No. 63/427,289, filed on Nov. 22, 2022, in the U.S. Patent and Trademark Office, the disclosure of which is incorporated by reference herein in its entirety.

BACKGROUND

1. Field

The present disclosure relates generally to key-step localization, and more particularly to methods, apparatuses, and non-transitory computer-readable media for performing step discovery and localization in instructional videos using a self-supervised transformer model.

2. Description of Related Art

Observing a task being performed (e.g., cooking a recipe, assembling furniture, changing a flat tire, and the like) may be a common approach for acquiring new skills. As such, instructional videos may be an important resource from which to learn a procedural task. That is, a user may learn how to perform a task by learning from and/or imitating the steps and/or descriptions provided by another person (e.g., an instructor) demonstrating the procedural task on the instructional video. For example, a user may learn how to prepare a particular cooking recipe by following and learning from an instructional video in which that cooking recipe is prepared. In the same way, instructional videos may be used to teach a vast array of tasks, such as, but not limited to, furniture assembly and changing a tire of a vehicle.

However, the instructional portions (e.g., the portions of the instructional video that actually contain procedure steps) of a significant number of instructional videos may only include a small portion of the instructional video as a whole. That is, the majority of the instructional video may comprise content that may not be relevant to the procedure being taught. For example, the instructional portions of instructional videos may be interspersed with other content, such as, but not limited to, advertisements, title frames, storytelling by the instructor, interviews/discussions between people, and the like. Thus, filtering out the uninformative frames and focusing only on the task-relevant segments of the instructional videos may be advantageous.

Key-step localization may refer to the discovering and the temporally localizing of instruction steps in instructional videos. Related methods for performing key-step localization typically involve video-level human annotations. For example, a person may need to watch the instructional video, at least once, and generate annotations that may indicate the start and end times of each procedure step in the instructional video. However, such methods may be error-prone, time-consuming, and may not scale to large datasets of instructional videos.

Thus, there exists a need for further improvements to key-step localization techniques, as the need for large-scale instructional video resources that may be used by humans and/or artificial intelligence (AI) agents may be constrained by a lack of accuracy, an amount of resources that may be needed to step localize the instructional videos, and/or an inability to perform key-step localization on a large dataset. Improvements are presented herein. These improvements may also be applicable to other video segmentation technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable media for performing step discovery and localization in an instructional video are disclosed by the present disclosure. Aspects of the present disclosure provide for using a self-supervised transformer model to perform step discovery and localization in an instructional video.

According to an aspect of the present disclosure, a method of step discovery and localization in an instructional video, to be performed by a processor is provided. The method includes extracting, from the instructional video using a transformer model, a plurality of step slots corresponding to a plurality of procedure steps depicted in the instructional video. The method further includes matching, using an order-aware sequence-to-sequence alignment model, a plurality of video segments of the instructional video to the plurality of step slots. The method further includes generating a temporally-ordered plurality of video segments from the plurality of video segments. Each video segment of the temporally-ordered plurality of video segments has a matching textual step description. The method further includes receiving a user query requesting a procedure step. The method further includes selecting, from the plurality of video segments of the instructional video, a corresponding video segment corresponding to the requested procedure step. The method further includes providing, in response to the user query, the corresponding video segment and the matching textual step description of the corresponding video segment.

In some embodiments, the method may further include obtaining a plurality of textual step descriptions of the instructional video. In such embodiments, the matching of the plurality of video segments of the instructional video to the plurality of step slots may include matching the plurality of video segments of the instructional video and the plurality of textual step descriptions of the instructional video to the plurality of step slots. In such embodiments, the providing of the corresponding video segment may include providing, in response to the user query, the corresponding video segment and the matching textual step description from among the plurality of textual step descriptions.

In some embodiments, the method may further include obtaining a procedure graph indicating an ordered list of the plurality of procedure steps depicted in the instructional video. In such embodiments, the generating of the temporally-ordered plurality of video segments from the plurality of video segments may include generating the temporally-ordered plurality of video segments from the plurality of video segments, according to the procedure graph.

In some embodiments, the extracting of the plurality of step slots may include extracting, from the instructional video using the transformer model, the plurality of step slots corresponding to the plurality of procedure steps depicted in the instructional video. The transformer model may have been acquired by machine learning using a plurality of instructional videos and supervised using automatically generated narrations of the plurality of instructional videos.

In some embodiments, the matching of the plurality of video segments of the instructional video to the plurality of step slots may include deleting a step slot from the plurality of step slots that fails to match with the plurality of video segments of the instructional video.

In some embodiments, the matching of the plurality of video segments of the instructional video to the plurality of step slots may include deleting a step slot from the plurality of step slots matched with a video segment excluding the plurality of procedure steps depicted in the instructional video.

In some embodiments, the method may further include mapping the plurality of video segments and the user query into feature vectors in a shared embedding space, and selecting the corresponding video segment having a first feature vector that minimizes a distance to a second feature vector of the user query as the corresponding video segment corresponding to the requested procedure step.

According to an aspect of the present disclosure, an apparatus for performing step discovery and localization in an instructional video is provided. The apparatus includes a memory storing computer-executable instructions and a processor communicatively coupled to the memory. The processor is configured to execute the computer-executable instructions to extract, from the instructional video using a transformer model, a plurality of step slots corresponding to a plurality of procedure steps depicted in the instructional video. The processor is further configured to execute the computer-executable instructions to match, using an order-aware sequence-to-sequence alignment model, a plurality of video segments of the instructional video to the plurality of step slots. The processor is further configured to execute the computer-executable instructions to generate a temporally-ordered plurality of video segments from the plurality of video segments. Each video segment of the temporally-ordered plurality of video segments has a matching textual step description. The processor is further configured to execute the computer-executable instructions to receive a user query requesting a procedure step. The processor is further configured to execute the computer-executable instructions to select, from the plurality of video segments of the instructional video, a corresponding video segment corresponding to the requested procedure step. The processor is further configured to execute the computer-executable instructions to provide, in response to the user query, the corresponding video segment and the matching textual step description of the corresponding video segment.

In some embodiments, the processor of the apparatus may be further configured to execute the computer-executable instructions to obtain a plurality of textual step descriptions of the instructional video, match the plurality of video segments of the instructional video and the plurality of textual step descriptions of the instructional video to the plurality of step slots, and provide, in response to the user query, the corresponding video segment and the matching textual step description from among the plurality of textual step descriptions.

In some embodiments, the processor of the apparatus may be further configured to execute the computer-executable instructions to obtain a procedure graph indicating an ordered list of the plurality of procedure steps depicted in the instructional video, and generate the temporally-ordered plurality of video segments from the plurality of video segments, according to the procedure graph.

In some embodiments, the processor of the apparatus may be further configured to execute the computer-executable instructions to extract, from the instructional video using the transformer model, the plurality of step slots corresponding to the plurality of procedure steps depicted in the instructional video. The transformer model may have been acquired by machine learning using a plurality of instructional videos and supervised using automatically generated narrations of the plurality of instructional videos.

In some embodiments, the processor of the apparatus may be further configured to execute the computer-executable instructions to delete a step slot from the plurality of step slots that fails to match with the plurality of video segments of the instructional video.

In some embodiments, the processor of the apparatus may be further configured to execute the computer-executable instructions to delete a step slot from the plurality of step slots matched with a video segment excluding the plurality of procedure steps depicted in the instructional video.

In some embodiments, the processor of the apparatus may be further configured to execute the computer-executable instructions to map the plurality of video segments and the user query into feature vectors in a shared embedding space, and select the corresponding video segment having a first feature vector that minimizes a distance to a second feature vector of the user query as the corresponding video segment corresponding to the requested procedure step.

According to an aspect of the present disclosure, a non-transitory computer-readable storage medium storing computer-executable instructions for performing step discovery and localization in an instructional video is provided. The computer-executable instructions are configured, when executed by at least one processor of a device, to cause the device to extract, from the instructional video using a transformer model, a plurality of step slots corresponding to a plurality of procedure steps depicted in the instructional video. The computer-executable instructions further cause the device to match, using an order-aware sequence-to-sequence alignment model, a plurality of video segments of the instructional video to the plurality of step slots. The computer-executable instructions further cause the device to generate a temporally-ordered plurality of video segments from the plurality of video segments. Each video segment of the temporally-ordered plurality of video segments has a matching textual step description. The computer-executable instructions further cause the device to receive a user query requesting a procedure step. The computer-executable instructions further cause the device to select, from the plurality of video segments of the instructional video, a corresponding video segment corresponding to the requested procedure step. The computer-executable instructions further cause the device to provide, in response to the user query, the corresponding video segment and the matching textual step description of the corresponding video segment.

In some embodiments, the computer-executable instructions may further cause the device to obtain a plurality of textual step descriptions of the instructional video, match the plurality of video segments of the instructional video and the plurality of textual step descriptions of the instructional video to the plurality of step slots, and provide, in response to the user query, the corresponding video segment and the matching textual step description from among the plurality of textual step descriptions.

In some embodiments, the computer-executable instructions may further cause the device to obtain a procedure graph indicating an ordered list of the plurality of procedure steps depicted in the instructional video, and generate the temporally-ordered plurality of video segments from the plurality of video segments, according to the procedure graph.

In some embodiments, the computer-executable instructions may further cause the device to extract, from the instructional video using the transformer model, the plurality of step slots corresponding to the plurality of procedure steps depicted in the instructional video. The transformer model may have been acquired by machine learning using a plurality of instructional videos and supervised using automatically generated narrations of the plurality of instructional videos.

In some embodiments, the computer-executable instructions may further cause the device to delete a step slot from the plurality of step slots that fails to match with the plurality of video segments of the instructional video.

In some embodiments, the computer-executable instructions may further cause the device to map the plurality of video segments and the user query into feature vectors in a shared embedding space, and select the corresponding video segment having a first feature vector that minimizes a distance to a second feature vector of the user query as the corresponding video segment corresponding to the requested procedure step.

Additional aspects are set forth in part in the description that follows and, in part, may be apparent from the description, and/or may be learned by practice of the presented embodiments of the disclosure.

BRIEF DESCRIPTION OF THE DRAWINGS

The above and other aspects, features, and advantages of certain embodiments of the present disclosure may be more apparent from the following description taken in conjunction with the accompanying drawings, in which:

FIG. 10 illustrates a flowchart of an example method of step discovery and localization by an apparatus, in accordance with various aspects of the present disclosure.

DETAILED DESCRIPTION

Figure 1:
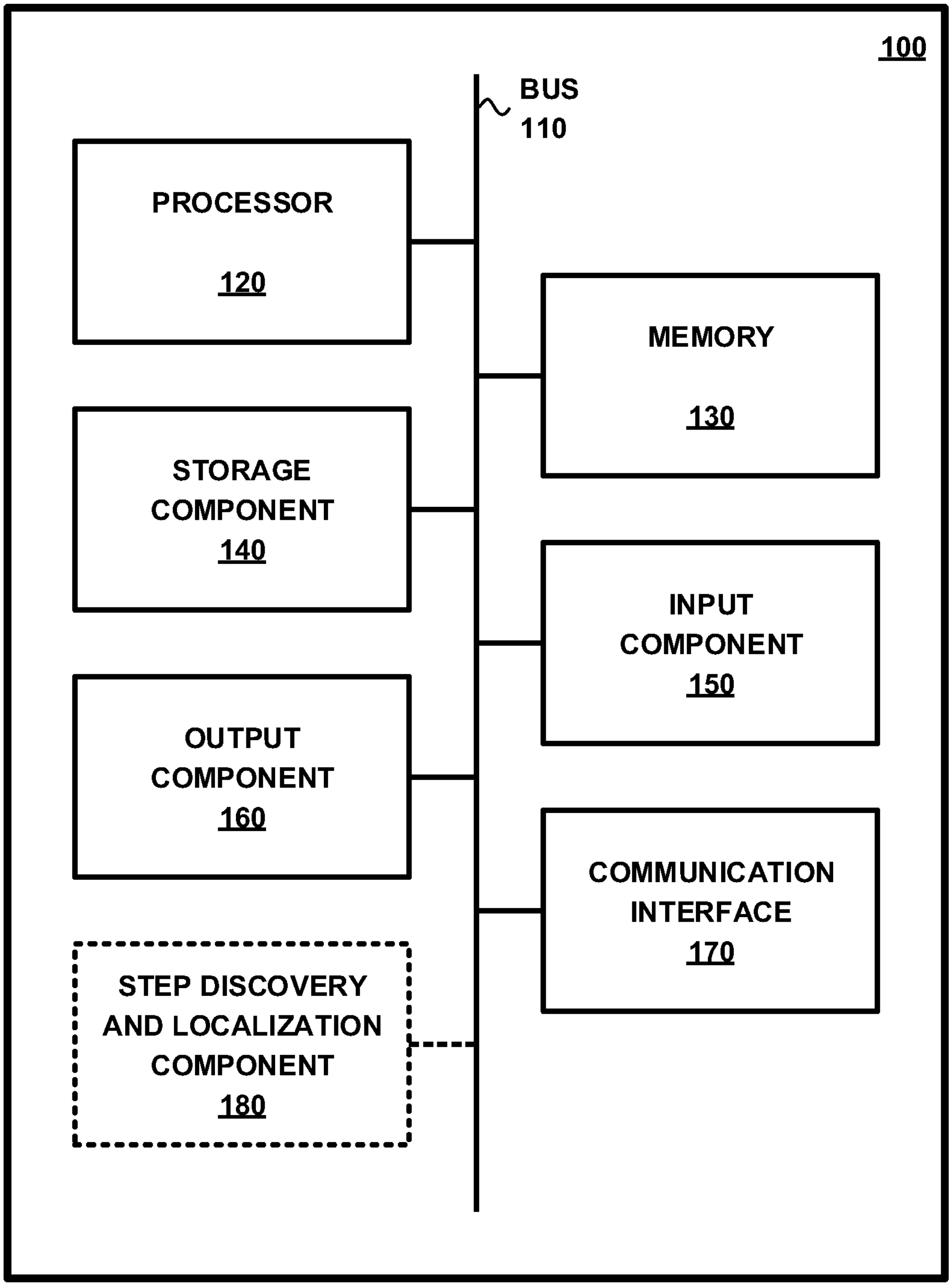
FIG. 1 depicts an example of a device that may be used in implementing one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it is to be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

The following description provides examples, and is not limiting of the scope, applicability, or embodiments set forth in the claims. Changes may be made in the function and/or arrangement of elements discussed without departing from the scope of the disclosure. Various examples may omit, substitute, or add various procedures or components as appropriate. For example, the methods described may be performed in an order different from that described, and various steps may be added, omitted, and/or combined. Alternatively or additionally, features described with reference to some examples may be combined in other examples.

Various aspects and/or features may be presented in terms of systems that may include a number of devices, components, modules, and the like. It is to be understood and appreciated that the various systems may include additional devices, components, modules, and the like and/or may not include all of the devices, components, modules, and the like discussed in connection with the figures. A combination of these approaches may also be used.

As a general introduction to the subject matter described in more detail below, aspects described herein are directed towards apparatuses, methods, and non-transitory computer-readable media for performing step discovery and localization. Aspects described herein may be used to perform step discovery and localization in an instructional video, using a self-supervised transformer model.

As used herein, step discovery and localization may refer to the identification of segments in an instructional video that correspond to instruction steps (e.g., key-steps). For example, in an instructional video describing a recipe for making a cake, the key-steps may include, but not be limited to, “crack eggs”, “whip eggs”, “add sugar”, “add flour”, “mix”, “pour in pan”, “bake”, and the like. Consequently, step discovery and localization may facilitate the exclusion of uninformative portions (e.g., advertisements, title frames, story-telling by the instructor, interviews/discussions between people, and the like) from the instructional video and focus on the segments of the instructional video that are relevant to the instructed task that contain the key-steps.

Aspects presented herein may provide for a self-supervised model configured to discover and localize instruction steps in a video. For example, the self-supervised model may be and/or may include a transformer decoder model that may process the video using learnable queries to produce a sequence of slots capturing the key-steps in the video. That is, the self-supervised model may discover the key-steps in the video without human intervention and/or without prior knowledge of the content of the video. In other aspects described herein, the discovered key-steps (e.g., step slots) may be semantically labeled such that the key-steps may be matched with video encodings and/or text encodings. Consequently, the discovered key-steps may be paired to segments of the video and/or to text descriptions of the segments of the video. Thus, aspects presented herein may be used to address a problem that may be referred to as a zero-shot multiple key-step discovery problem, where zero-shot, as used herein, may refer to performing the key-step discovery on an instructional video without annotations and/or prior knowledge of the content of the instructional video.

The aspects described herein may provide advantages over related key-step localization techniques by providing a self-supervised model capable of filtering out uninformative segments of an instructional video and determining the task relevant portions of the instructional video without prior knowledge as to the content of the video. Aspects described herein may further provide for labeling the discovered key-steps semantically such that the key-steps may be subsequently matched with textual descriptions of a procedure. As such, the aspects described herein may be applied to large datasets of instructional videos and may avoid a need for expensive and ambiguous human-driven labeling efforts that may be needed by related key-step localization techniques.

As noted above, certain embodiments are discussed herein that relate to step discovery and localization. Before discussing these concepts in further detail, however, an example of a computing device that may be used in implementing and/or otherwise providing various aspects of the present disclosure is discussed with reference to FIG. 1.

FIG. 1 depicts an example of a device 100 that may be used in implementing one or more aspects of the present disclosure in accordance with one or more illustrative aspects discussed herein. For example, device 100 may, in some instances, implement one or more aspects of the present disclosure by reading and/or executing instructions and performing one or more actions accordingly. In one or more arrangements, device 100 may represent, be incorporated into, and/or include a desktop computer, a computer server, a virtual machine, a network appliance, a mobile device (e.g., a laptop computer, a tablet computer, a personal digital assistant (PDA), a smart phone, any other type of mobile computing device, and the like), a wearable device (e.g., smart watch, headset, headphones, and the like), a smart device (e.g., a voice-controlled virtual assistant, a set-top box (STB), a refrigerator, an air conditioner, a microwave, a television, and the like), an Internet-of-Things (IoT) device, and/or any other type of data processing device.

For example, the device 100 may be and/or may include a processor, a personal computer (PC), a printed circuit board (PCB) including a computing device, a mini-computer, a mainframe computer, a microcomputer, a telephonic computing device, a wired/wireless computing device (e.g., a smartphone, a PDA a user equipment (UE)), a laptop computer, a tablet computer, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and a step discovery and localization component 180. The set of components of the device 100 may be communicatively coupled via a bus 110.

The bus 110 may include one or more components that may permit communication among the set of components of the device 100. For example, the bus 110 may be and/or may include a communication bus, a cross-over bar, a network, or the like. Although the bus 110 is depicted as a single line in FIG. 1, in practice, the bus 110 may be implemented using multiple (e.g., two or more) connections between the set of components of device 100. That is, the present disclosure is not limited in this regard.

The device 100 may include one or more processors, such as the processor 120. The processor 120 may be implemented in hardware, firmware, and/or a combination of hardware and software. For example, the processor 120 may be and/or may include a central processing unit (CPU), an application processor (AP), a graphics processing unit (GPU), an accelerated processing unit (APU), a microprocessor, a microcontroller, a digital signal processor (DSP), a field-programmable gate array (FPGA), an application-specific integrated circuit (ASIC), an image signal processor (ISP), a neural processing unit (NPU), a sensor hub processor, a communication processor (CP), an artificial intelligence (AI)-dedicated processor designed to have a hardware structure specified to process an AI model, a general purpose single-chip and/or multi-chip processor, or other programmable logic device, discrete gate or transistor logic, discrete hardware components, or any combination thereof designed to perform the functions described herein. A general purpose processor may be and/or may include a microprocessor, or any conventional processor, controller, microcontroller, or state machine.

The processor 120 may also be implemented as a combination of computing devices, such as a combination of a DSP and a microprocessor, a combination of a main processor and an auxiliary processor, a plurality of microprocessors, one or more microprocessors in conjunction with a DSP core, or any other such configuration. In some embodiments, particular processes and methods may be performed by circuitry that is specific to a given function. In optional or additional embodiments, an auxiliary processor may be configured to consume less power than the main processor. Alternatively or additionally, the one or more processors may be implemented separately (e.g., as several distinct chips) and/or may be combined into a single form.

The processor 120 may control overall operation of the device 100 and/or of the set of components of device 100 (e.g., the memory 130, the storage component 140, the input component 150, the output component 160, the communication interface 170, the step discovery and localization component 180).

The device 100 may further include the memory 130. In some embodiments, the memory 130 may be and/or may include volatile memory such as, but not limited to, random access memory (RAM), static RAM (SRAM), dynamic RAM (DRAM), and the like. In optional or additional embodiments, the memory 130 may be and/or may include non-volatile memory such as, but not limited to, read only memory (ROM), electrically erasable programmable ROM (EEPROM), NAND flash memory, phase-change RAM (PRAM), magnetic RAM (MRAM), resistive RAM (RRAM), ferroelectric RAM (FRAM), magnetic memory, optical memory, and the like. However, the present disclosure is not limited in this regard, and the memory 130 may include other types of dynamic and/or static memory storage. In an embodiment, the memory 130 may store information and/or instructions for use (e.g., execution) by the processor 120.

The storage component 140 of device 100 may store information, computer-readable instructions, and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further include the input component 150. The input component 150 may include one or more components that may permit the device 100 to receive information via user input (e.g., a touch screen, a keyboard, a keypad, a mouse, a stylus, a button, a switch, a microphone, a camera, a virtual reality (VR) headset, haptic gloves, and the like). Alternatively or additionally, the input component 150 may include one or more sensors for sensing information related to the device 100 (e.g., a global positioning system (GPS) component, an accelerometer, a gyroscope, an actuator, a thermometer, a barometric pressure sensor, a hygrometer, a sound meter, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, a buzzer, an alarm, and the like).

The device 100 may further include the communication interface 170. The communication interface 170 may be and/or may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, and/or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), and/or a combination of these or other types of networks. Alternatively or additionally, the communication interface 170 may provide for communications with another device via a device-to-device (D2D) communication link, such as, but not limited to, WiMedia, Bluetooth™, Bluetooth™ Low Energy (BLE), ZigBee, Institute of Electrical and Electronics Engineers (IEEE) 802.11x (Wi-Fi), LTE, 5G, and the like. In optional or additional embodiments, the communication interface 170 may include an Ethernet interface, an optical interface, a coaxial interface, an infrared interface, a radio frequency (RF) interface, a USB interface (e.g., USB-A, USB-B, USB-C, USB-3, mini-USB, micro-USB, and the like), an IEEE 1394 (FireWire) interface, a digital visual interface (DVI), a high-definition multimedia interface (HDMI), or the like.

In some embodiments, the device 100 may include the step discovery and localization component 180, which may be configured to perform step discovery and localization in an instructional video. For example, the step discovery and localization component 180 may be configured to extract a plurality of step slots from an instructional video, match the plurality of step slots with a plurality of video segments of the instructional video, and provide, in response to a query, a corresponding video segment and a matching textual step description of the corresponding video segment.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A non-transitory memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may perform one or more functions described as being performed by another set of components shown in FIG. 1.

Having discussed an example of a device that may be used in providing and/or implementing various aspects of the present disclosure, a number of embodiments are now discussed in further detail. In particular, and as introduced above, some aspects of the present disclosure generally relate to key-step localization, and more particularly to methods, apparatuses, and non-transitory computer-readable media for performing step discovery and localization in instructional videos using a self-supervised transformer model.

Figure 2:
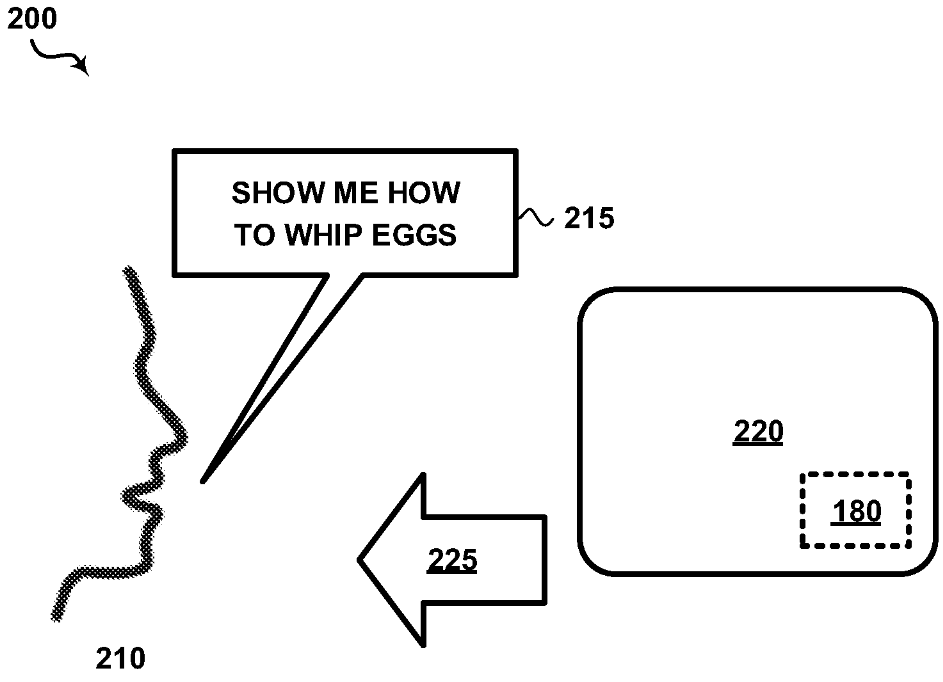
FIG. 2 illustrates an example use case for step discovery and localization, in accordance with various aspects of the present disclosure.

FIG. 2 illustrates an example use case for step discovery and localization, in accordance with various aspects of the present disclosure. The use case 200 of FIG. 2 may include a user 210 and a device 220.

The device 220 may include and/or may be similar in many respects to the device 100 described above with reference to FIG. 1 and may include additional features not mentioned above. For example, the device 220 may be and/or may include a computing device (e.g., a server, a laptop computer, a tablet computer, a smartphone, a PDA, a UE, a wearable device, a smart device, an IoT device, and the like) that includes at least the step discovery and localization component 180.

As shown in FIG. 2, the device 220 may be and/or may include a voice-controlled virtual assistant (e.g., Samsung Bixby, Amazon Alexa, Apple Sid, Google Assistant, Microsoft Cortana, and the like). That is, the device 220 may be configured to receive a command 215 (e.g., a natural language command) from the user 210, perform a task in response to the command 215, and provide a response 225 to the user 210. In an embodiment, the device 220 may receive the command 215 from the user 210 using the input component 150, such as, receiving a voice utterance using a microphone of the input component 150. However, the present disclosure is not limited in this regard, and the device 220 may receive the command 215 from the user 210 using other input devices that may or may not be part of the input component 150, such as, but not limited to, a touch screen, a keyboard, a keypad, a mouse, a stylus, a button, a switch, a camera, a VR headset, haptic gloves, and the like. Alternatively or additionally, the device 220 may receive the command 215 from the user 210 using the communication interface 170. For example, the user 210 may send a communication to the device 220 that includes the command 215 via a wired and/or wireless communication connection established between the device 220 and another computing device (e.g., smartphone, UE, tablet computer, laptop computer, wearable device, smart device, IoT device, and the like) of the user 210.

In an embodiment, the device 220 may process the command 215 (or query) from the user 210. For example, in a case in which the device 220 receives an audio utterance from the user 210 via the input component 150, the processing of the command 215 by the device 220 may include converting the audio utterance into words and/or a phrase and/or may include interpreting the audio utterance to determine the command 215 included in the audio utterance (e.g. "show me how to whip eggs" as shown in FIG. 2). Alternatively or additionally, the device 220 may provide the audio utterance to another computing device (e.g., a server, a laptop computer, a tablet computer, a smartphone, a PDA, a UE, a wearable device, a smart device, an IoT device, and the like) via a wired and/or wireless communication channel using the communication interface 170 and request the other computing device to interpret the audio utterance and/or determine the command 215 included in the audio utterance. For another example, in a case in which the device 220 receives a communication including the command 215, the processing of the command 215 by the device 220 may include processing the received communication to determine the command 215.

The device 220, according to an embodiment, may identify an instruction step corresponding to the command 215. That is, the device 220 may match an instruction step of an instructional video with the command 215. For example, as shown in FIG. 2, the device 220 may match "show me how to whip eggs" to a "whip eggs" step of an instructional video on how to make a cake. However, the present disclosure is not limited in this regard, and it is understood that the device 220 may match the command 215 and/or other commands to other instruction steps of other instructional videos. Alternatively or additionally, the device 220 may provide the command 215 to another computing device (e.g., a server, a laptop computer, a tablet computer, a smartphone, a PDA, a UE, a wearable device, a smart device, an IoT device, and the like) via a wired and/or wireless communication channel using the communication interface 170 and request the other computing device to match the command 215 to an instruction step.

In an embodiment, the device 220 may select a relevant video segment corresponding to the identified instruction step. Referring to FIG. 2, the device 220 may select a video segment demonstrating a "whip eggs" instruction step from an instructional video for making a cake. For example, the device 220 may generate a feature vector corresponding to the identified instruction step, compare the feature vector of the identified instruction step to feature vectors of video segments, and select, as a relevant video segment, a video segment that has a feature vector that minimizes a distance to the feature vector of the identified instruction step. In an embodiment, the feature vectors of the video segments may be obtained from the storage component 140 of the device 220. In an optional or additional embodiment, the device 220 may access the feature vectors of the video segments via a wired and/or wireless communication channel to another computing device (e.g., a server, a laptop computer, a tablet computer, a smartphone, a PDA, a UE, a wearable device, a smart device, an IoT device, and the like) using the communication interface 170.

Alternatively or additionally, the device 220 may provide the identified instruction step to another computing device (e.g., a server, a laptop computer, a tablet computer, a smartphone, a PDA, a UE, a wearable device, a smart device, an IoT device, and the like) via a wired and/or wireless communication channel using the communication interface 170 and request the other computing device to select a relevant video segment corresponding to the identified instruction step. A process for step discovery and localization that may be used to select a video segment corresponding to the command 215, according to various embodiments of the present disclosure, is described with reference to FIGS. 3 to 7.

Continuing to refer to FIG. 2, the device 220 may provide a response 225 according to the command 215. For example, the response 225 may include displaying to the user 210 the selected video segment corresponding to the identified instruction step from the command 215. That is, in an embodiment, the device 220 may use the output component 160 to display, to the user 210, video and/or audio content of the selected video segment. The device 220 may obtain the selected video segment from the storage component 140 and/or may access the selected video segment via a wired and/or wireless connection with another computing device (e.g., a server, a laptop computer, a tablet computer, a smartphone, a PDA, a UE, a wearable device, a smart device, an IoT device, and the like) using the communication interface 170. In an optional or additional embodiment, the device 220 may instruct another computing device (e.g., a television (TV), a laptop computer, a tablet computer, a smartphone, a PDA, a UE, a wearable device, a smart device, an IoT device, and the like) to display the selected video segment. For example, the device 220 may provide information of the selected video segment to the other computing device via a wired and/or wireless communication channel using the communication interface 170. The information of the selected video segment may include the video and/or audio content of the selected video segment, and/or may include address information (e.g., uniform resource locator (URL)) indicating a storage location of the selected video segment and/or access information (e.g., credentials) providing access to the other computing device to the selected video segment.

Although FIG. 2 depicts a particular example of a use case for step discovery and localization, the present disclosure is not limited in this regard. That is, the aspects presented herein are not limited to the example use case depicted in FIG. 2 and may be used by other elements to perform other use cases related to step discovery and localization. As a non-limiting example, an artificial intelligence (AI) agent may request for and/or obtain video segments of instructional videos for training purposes and/or in response to a query.

Having discussed an example use case for step discovery and localization according to various aspects of the present disclosure, a number of optional and/or additional embodiments are now discussed in reference to FIGS. 3 to 7. In particular, and as introduced above, some aspects of the present disclosure provide methods and/or apparatuses for step discovery and localization that may process an instructional video using learnable queries to produce a sequence of slots capturing the key-steps in the instructional video, without human intervention and/or without prior knowledge of the content of the instructional video. In other aspects of the present disclosure, the discovered key-steps (e.g., step slots) may be semantically labeled such that the key-steps may be matched with video encodings and/or text encodings and/or paired to segments of the instructional video and/or to text descriptions of the segments of the instructional video.

Figure 3:
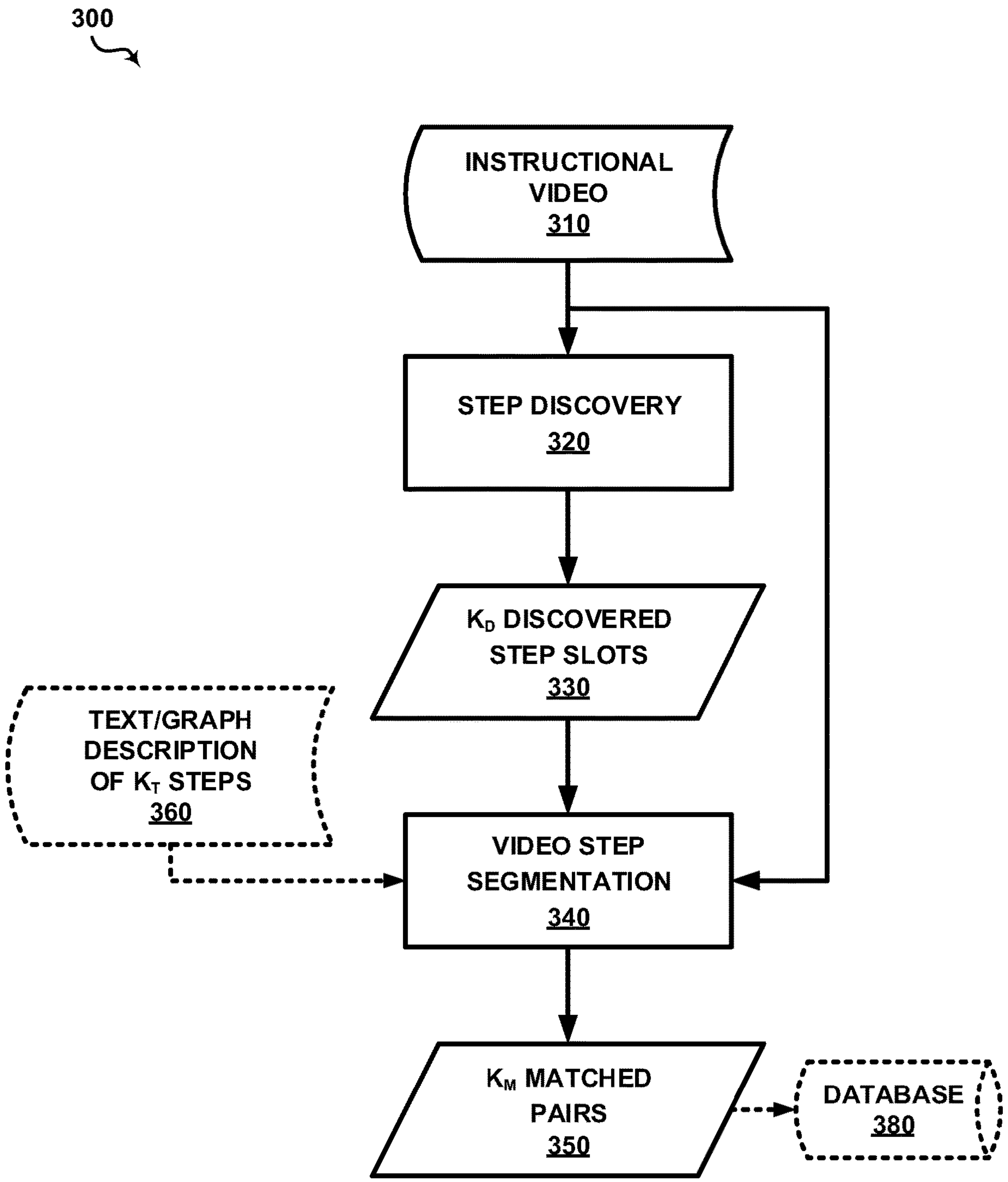
FIG. 3 depicts an example process for step discovery and localization, in accordance with various aspects of the present disclosure.

FIG. 3 depicts an example process for step discovery and localization, in accordance with various aspects of the present disclosure. Referring to FIG. 3, the step discovery and localization process 300 may implement one or more aspects of the present disclosure.

In some embodiments, at least a portion of the step discovery and localization process 300 may be performed by at least one of the device 100 of FIG. 1 and the device 220 of FIG. 2, which may include the step discovery and localization component 180. Alternatively or additionally, another computing device (e.g., a server, a laptop, a smartphone, a UE, a wearable device, a smart device, an IoT device, and the like) that includes the step discovery and localization component 180 may perform at least a portion of the step discovery and localization process 300. In some optional or additional embodiments, the step discovery and localization process 300 may be performed by at least one of the device 100 of FIG. 1 and the device 220 of FIG. 2 in conjunction with another computing device (e.g., a server, a laptop, a smartphone, a UE, a wearable device, a smart device, an IoT device, and the like). In such embodiments, the device (e.g., device 100 of FIG. 1, device 220 of FIG. 2) may be communicatively coupled to the other computing device via a wired and/or wireless communication channel using the communication interface 170.

As shown in FIG. 3, the step discovery and localization process 300 may include accessing an instructional video 310. As used herein, the instructional video 310 may refer to a video (e.g., a temporal sequence of still video frames that may contain audio content that may be synchronized to the video frames) that demonstrates a task and/or procedure that is intended to be taught to a viewer (e.g., a human, an AI agent). For example, the instructional video 310 may be used to teach a vast array of tasks, such as, but not limited to, making a cake, furniture assembly, and changing a tire of a vehicle. Alternatively or additionally, the instructional video 310 may further include other uninformative content (e.g., advertisements, title frames, story-telling by the instructor, interviews/discussions between people, and the like) that may be interspersed in between the instructional content. In some embodiments, the instructional video 310 may be part of an instructional video dataset that may have a large amount (e.g., over 3,000 videos) of instructional videos.

In an embodiment, the device (e.g., device 100 of FIG. 1, device 220 of FIG. 2) may access an instructional video 310 that may be stored (e.g., locally) by the storage component 140. In an optional or additional embodiment, the device may access an instructional video 310 that may be stored (e.g., remotely) in another computing device (e.g., a server, a laptop, a smartphone, a UE, a wearable device, a smart device, an IoT device, and the like) via a wired and/or wireless communication using the communication interface 170.

The step discovery and localization process 300 may further include, in operation 320, performing step discovery. For example, a step discovery component may be configured to extract, from the instructional video 310 using a transformer model, a plurality of discovered step slots 330 corresponding to a plurality of procedure steps depicted in the instructional video 310. As shown in FIG. 3, the plurality of discovered step slots 330 may include $K_D$ discovered step slots, where $K_D$ is an integer greater than zero (e.g., $K_D>0$). The step discovery component 320 is further described with reference to FIGS. 4 and 5.

In operation 340, the step discovery and localization process 300 may further include performing video step segmentation. For example, a video step segmentation component 340 may be configured to match, using an order-aware sequence-to-sequence alignment model, a plurality of video segments of the instructional video 310 to the plurality of $K_D$ discovered step slots 330. The video step segmentation component 340 may be further configured to generate a plurality of matched pairs 350. The plurality of matched pairs 350 may include a temporally-ordered plurality of video segments from the plurality of video segments of the instructional video 310 that have been matched to at least a portion of the plurality of $K_D$ discovered step slots 330. Each video segment of the temporally-ordered plurality of video segments may have a matching textual step description. As shown in FIG. 3, the plurality of matched pairs 350 may include $K_M$ matched pairs, where $K_M$ is an integer greater than zero (e.g., $K_M>0$). That is, each matched pair ($v_i$, $d_i$) of the plurality of matched pairs 350 may include a video segment $v_i$ and a text description $d_i$, where $i=1, \ldots, K_M$. For example, referring to the use case described with reference to FIG. 2, a video segment $v_i$ of a matched pair of the plurality of $K_M$ matched pairs 350 may be and/or may include a video segment demonstrating how to "whip eggs" (e.g., text description $d_i$="whip eggs").

In an optional or additional embodiment, the video step segmentation component 340 may obtain a plurality of text descriptions 360 in the form of an ordered list of step descriptions and/or in the form of a procedure graph. As shown in FIG. 3, the plurality of text descriptions 360 may include $K_T$ text descriptions, where $K_T$ is an integer greater than zero (e.g., $K_T>0$). In such an embodiment, the video step segmentation component 340 may generate the plurality of $K_M$ matched pairs 350 according to the plurality of $K_T$ text descriptions 360. In an embodiment, the video step segmentation component 340 may not match all of discovered step slots in the plurality of $K_D$ discovered step slots 330 to all the text descriptions of the plurality of $K_T$ text descriptions 360. That is, the plurality of $K_M$ matched pairs 350 may have a smaller number of elements than the plurality of $K_D$ discovered step slots 330 and the plurality of $K_T$ text descriptions 360 (e.g., $K_M \leq \min(K_D, K_T)$). The video step segmentation component 340 is further described with reference to FIGS. 4, 6, and 7.

The step discovery and localization process 300 may further include, according to an optional or additional embodiment, storing the plurality of $K_M$ matched pairs 350. For example, the plurality of $K_M$ matched pairs 350 may be stored in a database 380. However, the present disclosure is not limited in this regard. For example, the plurality of $K_M$ matched pairs 350 may be stored in a manner that may allow for searching and/or comparing the plurality of $K_M$ matched pairs 350 with a requested instruction step as described above with reference to FIG. 2.

The plurality of $K_M$ matched pairs 350 may be stored locally with regard to the device (e.g., device 100 of FIG. 1, device 220 of FIG. 2) using storage component 140. Alternatively or additionally, the plurality of $K_M$ matched pairs 350 may be stored remotely with regard to the device (e.g., device 100 of FIG. 1, device 220 of FIG. 2) using another computing device (e.g., a server, a laptop, a smartphone, a UE, a wearable device, a smart device, an IoT device, and the like) that may be communicatively coupled to the device via a wired and/or wireless communication using the communication interface 170.

In some optional or additional embodiments, the step discovery and localization process 300 may further include receiving a user query requesting a procedure step (e.g., command 215 of FIG. 2), selecting, from the plurality of video segments of the instructional video (e.g., the plurality of $K_M$ matched pairs 350) that may be stored in the database 380, a corresponding video segment corresponding to the requested procedure step, and providing, in response to the user command 215, the corresponding video segment and the matching textual step description of the corresponding video segment (e.g., response 225 of FIG. 2).

Figure 4:
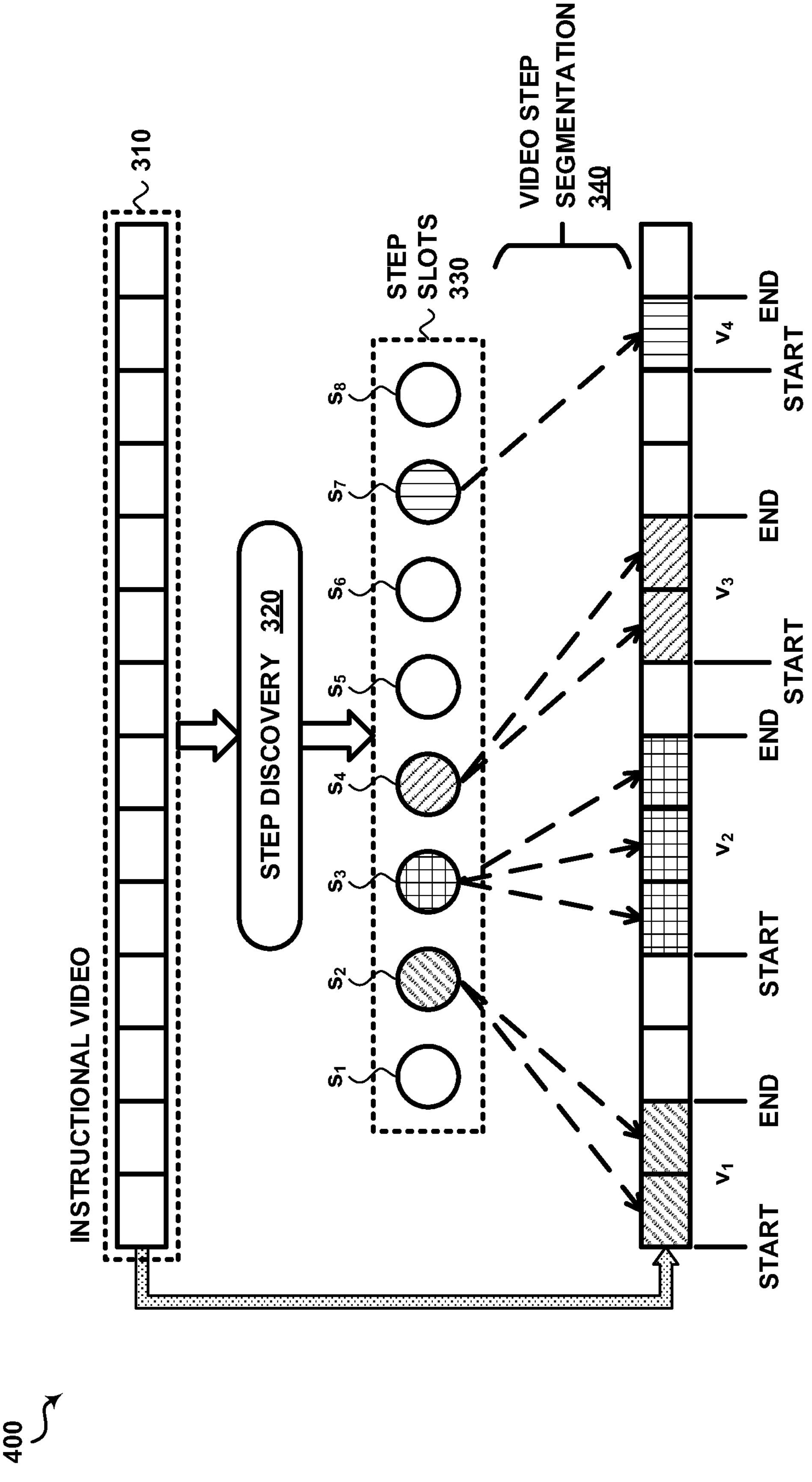
FIG. 4 illustrates an example flow diagram for step discovery and localization, in accordance with various aspects of the present disclosure.

FIG. 4 illustrates an example flow diagram for step discovery and localization, in accordance with various aspects of the present disclosure. Referring to FIG. 4, the flow diagram 400 may implement one or more aspects of the present disclosure.

In some embodiments, at least a portion of the flow diagram 400 may be performed by at least one of the device 100 of FIG. 1 and the device 220 of FIG. 2, which may include the step discovery and localization component 180. Alternatively or additionally, another computing device (e.g., a server, a laptop, a smartphone, a UE, a wearable device, a smart device, an IoT device, and the like) that includes the step discovery and localization component 180 may perform at least a portion of the flow diagram 400. In some optional or additional embodiments, the flow diagram 400 may be performed by at least one of the device 100 of FIG. 1 and the device 220 of FIG. 2 in conjunction with another computing device (e.g., a server, a laptop, a smartphone, a UE, a wearable device, a smart device, an IoT device, and the like). In such embodiments, the device (e.g., device 100 of FIG. 1, device 220 of FIG. 2) may be communicatively coupled to the other computing device via a wired and/or wireless communication channel using the communication interface 170.

In an embodiment, the step discovery component 320 may generate a plurality of discovered step slots 330 from the instructional video 310. That is, the step discovery component 320 may extract, from the instructional video 310 using a transformer model, the plurality of discovered step slots 330 corresponding to a plurality of procedure steps depicted in the instructional video 310. As shown in FIG. 4, the plurality of discovered step slots 330 may include eight (8) discovered step slots (e.g., first discovered step slot $s_1$, second discovered step slot $s_2$, third discovered step slot $s_3$, fourth discovered step slot $s_4$, fifth discovered step slot $s_5$, sixth discovered step slot $s_6$, seventh discovered step slot $s_7$, and eighth discovered step slot $s_8$). However, the present disclosure is not limited in this regard, and the step discovery component 320 may generate fewer step slots (e.g., seven (7) or less) and/or may generate more step slots (e.g., nine (9) or more) from the instructional video 310. The step discovery component 320 is further described with reference to FIG. 5.

In an optional or additional embodiment, the video segmentation component 340 may match, using an order-aware sequence-to-sequence alignment model, a plurality of video segments of the instructional video 310 to the plurality of discovered step slots 330. That is, the video segmentation component 340 may estimate start and end times of video segments of the instructional video 310 that correspond to at least a portion of the plurality of discovered step slots 330. For example, the video segmentation component 340 may match at least a portion of the plurality of discovered step slots 330 to respective video segments of the instructional video 310. Alternatively or additionally, the video segmentation component 340 may identify discovered step slots and/or video segments that may be outliers (e.g., duplicates, step slots and/or video segments that do not have a match, step slots and/or video segments that have a weak match that does not meet a threshold, and the like).

For example, the discovered step slots and video segments depicted in FIG. 4 as having a same fill pattern may represent examples of matches that may have been made by the video step segmentation component 340. Alternatively or additionally, the discovered step slots and video segments depicted in FIG. 4 as having an empty (e.g., white) fill pattern may represent examples of discovered step slots and video segments that may have been identified as outliers. For example, as shown in FIG. 4, the video segmentation component 340 may match the second discovered step slot $s_2$ to a first video segment $v_1$, the third discovered step slot $s_3$ to a second video segment $v_2$, the fourth discovered step slot $s_4$ to a third video segment $v_3$, and the seventh discovered step slot $s_7$ to a fourth video segment $v_4$. That is, the video segments of the instructional video 310 having a non-empty fill pattern (e.g., a first video segment $v_1$, a second video segment $v_2$, a third video segment $v_3$, and a fourth video segment $v_4$) may represent a final result (e.g., the plurality of matched pairs 350) of the flow diagram 400, according to an embodiment. However, the present disclosure is not limited in this regard, and the video segmentation component 340 may match fewer step slots and/or more step slots to other video segments of the instructional video 310.

Alternatively or additionally, the video segmentation component 340 may generate a plurality of matched pairs 350. The plurality of matched pairs 350 may include a temporally-ordered plurality of video segments from the plurality of video segments (e.g., first to fourth video segments $v_1$, to $v_4$) of the instructional video that have been matched to a step slots. Each video segment of the temporally-ordered plurality of video segments may have a matching textual step description corresponding to the matching discovered step slot (e.g., the second discovered step slot $s_2$, the third discovered step slot $s_3$, the fourth discovered step slot $s_4$, and the seventh discovered step slot $s_7$). The step discovery component 320 is further described with reference to FIGS. 6 and 7.

Figure 5:
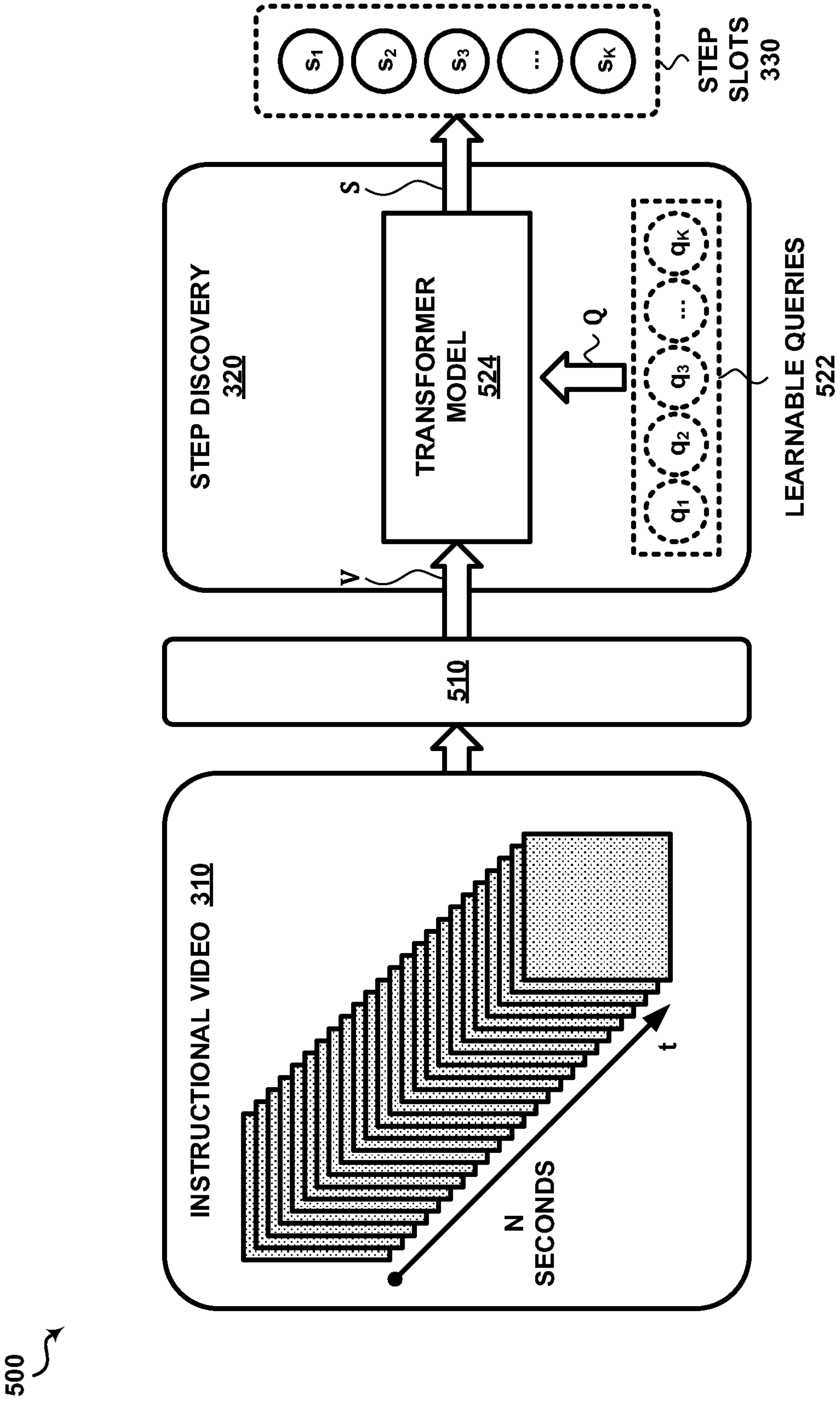
FIG. 5 depicts an example block diagram for a step discovery component, in accordance with various aspects of the present disclosure.

FIG. 5 depicts an example block diagram for a step discovery component, in accordance with various aspects of the present disclosure. Referring to FIG. 5, a block diagram 500 of the step discovery component 320 that implements one or more aspects of the present disclosure is depicted.

In some embodiments, at least a portion of the step discovery component 320 may be implemented by at least one of the device 100 of FIG. 1 and the device 220 of FIG. 2, which may include the step discovery and localization component 180. Alternatively or additionally, another computing device (e.g., a server, a laptop, a smartphone, a UE, a wearable device, a smart device, an IoT device, and the like) that includes the step discovery and localization component 180 may implement at least a portion of the step discovery component 320. In some optional or additional embodiments, the step discovery component 320 may be implemented by at least one of the device 100 of FIG. 1 and the device 220 of FIG. 2 in conjunction with another computing device (e.g., a server, a laptop, a smartphone, a UE, a wearable device, a smart device, an IoT device, and the like). In such embodiments, the device (e.g., device 100 of FIG. 1, device 220 of FIG. 2) may be communicatively coupled to the other computing device via a wired and/or wireless communication channel using the communication interface 170.

In an embodiment, an instructional video 310 having a time length of N seconds may be provided to the step discovery component 320, where N is a real number greater than zero (0) (e.g., N>0). Alternatively or additionally, the step discovery component 320 may access the instructional video 310. As described above, the instructional video 310 may be and/or may include a temporal sequence of still video frames that may contain audio content that may be synchronized to the video frames. Alternatively or additionally, the instructional video may include instructional portions (e.g., portions of the instructional video 310 that may contain procedure steps) that may be interspersed with other content, such as, but not limited to, advertisements, title frames, story-telling by the instructor, interviews/discussions between people, and the like.

As shown in FIG. 5, the instructional video 310 may be encoded by a video encoder 510. The video encoder 510 may be and/or may include a pre-trained video and language encoder. For example, the video encoder 510 may be and/or may include, but not be limited to, a multimodal unified video and language (UniVL) encoder model that may have been pre-trained on a large-scale instructional video dataset (e.g., HowTo100M). In an embodiment, the video encoder 510 may be configured to embed video captions to the instructional video 310. That is, the video encoder 510 may annotate video clips of the instructional video 310 with at least one captioning sentence. The video captions may be descriptive of the content of each video clip of the instructional video 310. Consequently, the video encoder 510 may annotate the instructional video 310 without a need for narrations, captions, and the like to be already included in the instructional video 310.

In an optional or additional embodiment, the step discovery component 320 may add sinusoidal positional embeddings to the video captions in order to form video features V. For example, the video features V may represent an N×d dimensional matrix (e.g., $V\in\mathbb{R}^{N\times d}$), where d may represent the dimension of the embedding for each video clip, and N may represent the number of clips in the instructional video.

The step discovery component 320 may include, according to an embodiment, a transformer model $\mathcal{T}$ 524. The transformer model $\mathcal{T}$ 524 may be and/or may include a multi-layer pre-layer normalization (pre-LN) transformer decoder. For example, the transformer model $\mathcal{T}$ 524 may have six (6) layers, however, the present disclosure is not limited in this regard. That is, the transformer model $\mathcal{T}$ 524 may have fewer layers (e.g., five (5) or less) and/or may have more layers (e.g., seven (7) or more), without departing from the scope of the disclosure.

In an embodiment, each layer of the transformer model $\mathcal{T}$ 524 may have access to the video features V, as well as, the output from the previous layer of the transformer model $\mathcal{T}$ 524. Alternatively or additionally, in the case of the first layer of the transformer model $\mathcal{T}$ 524, the first layer may have access to K learnable queries 522 (e.g., first step query $q_1$, second step query $q_2$, third step query $q_3$, . . . , K-th step query $q_K$), where K is an integer greater than zero (0) (e.g., K>0). For example, the K learnable queries 522 may be denoted by Q, where Q may be a K×d dimensional matrix (e.g., $Q\in\mathbb{R}^{K\times d}$). In an optional or additional embodiment, each layer of the transformer model $\mathcal{T}$ 524 may output a K×d dimensional matrix. Alternatively or additionally, the output of the last layer of the transformer model $\mathcal{T}$ 524 may output a K×d dimensional matrix that may be denoted by S (e.g., $S\in\mathbb{R}^{K\times d}$), whose K rows may be the plurality of discovered step slots 330 (e.g., first discovered step slot $s_1$, second discovered step slot $s_2$, third discovered step slot $s_3$, . . . , K-th discovered step slot $s_K$), described with reference to FIG. 3. That is, the plurality of discovered step slots 330 may be denoted by $s=\mathcal{T}(v, q)$.

Since the plurality of discovered step slots 330 has been created by the layers of the transformer model $\mathcal{T}$ 524, the plurality of discovered step slots 330 may have been contextualized (e.g., conditioned) over the instructional video 310, as encoded by the video features V. As such, each discovered step slot of the plurality of discovered step slots 330 may correspond to a procedural key-segment in the instructional video 310 and may include semantics of the procedural key-segment. It is to be understood that different step slots may bind to different segments of the instructional video 310. Consequently, each discovered step slot of the plurality of discovered step slots 330 may potentially represent a different instruction step.

In an optional or additional embodiment, the number of learnable queries 522 and the number of corresponding discovered step slots 330, K, may be fixed. For example, the value of K may be set to a large constant value (e.g., K≥32) that may remain fixed even when the time length N of the instructional video 310 may vary. Consequently, the plurality of discovered step slots 330 may include duplicate step slots (e.g., multiple step slots corresponding to a same video segment) and/or may include step slots having no binding and/or a weak binding (e.g., binding does not exceed a minimum threshold) with the video segment. Thus, the plurality of discovered step slots 330 may be further processed by the video step segmentation component 340 to select a subset of the plurality of discovered step slots 330 that may concisely describe the given instructional video. Alternatively or additionally, the video step segmentation component 340 may enforce that the discovered step slots 330 be temporally ordered. For example, the video step segmentation component 340 may enforce that a video segment captured by $s_i$ occurs at a timestamp prior to a timestamp of a video segment captured by $s_j$ (e.g., when i<j). The video step segmentation component 340 is further described with reference to FIGS. 6 and 7.

In an embodiment, the step discovery component 320 may extract, from the instructional video 310 using the transformer model $\mathcal{T}$ 524, the plurality of discovered step slots 330 corresponding to a plurality of procedure steps depicted in the instructional video 310. Alternatively or additionally, the transformer model $\mathcal{T}$ 524 may have been acquired by machine learning using a plurality of instructional videos (e.g., HowTo100M dataset) and supervised using automatically generated narrations of the plurality of instructional videos.

As described above, the step discovery component 320 may output a plurality of step slots 330 that may be semantically meaningful and may be aligned (e.g., matched) with steps described in a separate textual description of a procedure. That is, the step discovery component 320 may provide information about the key-steps depicted in an instructional video 310, along with information suitable for temporal segmentation of the instructional video 310 into the key-steps (e.g., removing uninformative portions of the instructional video 310), as well as semantic information about what is being done in each step (e.g., crack eggs, whip eggs, add sugar, add flour, mix, pour in pan, bake, and the like).

The temporal ordering and semantic content of the plurality of step slots 330 may arise from the form of training data and losses that may be used to train the transformer model $\mathcal{T}$ 524, as described with reference to FIG. 8. As such, the plurality of step slots 330 generated by the step discovery component 320 may be used to filter out the uninformative portions of the instructional video 310, segment the instructional video 310 into relevant steps, and provide semantic information about each relevant step.

Figure 6:
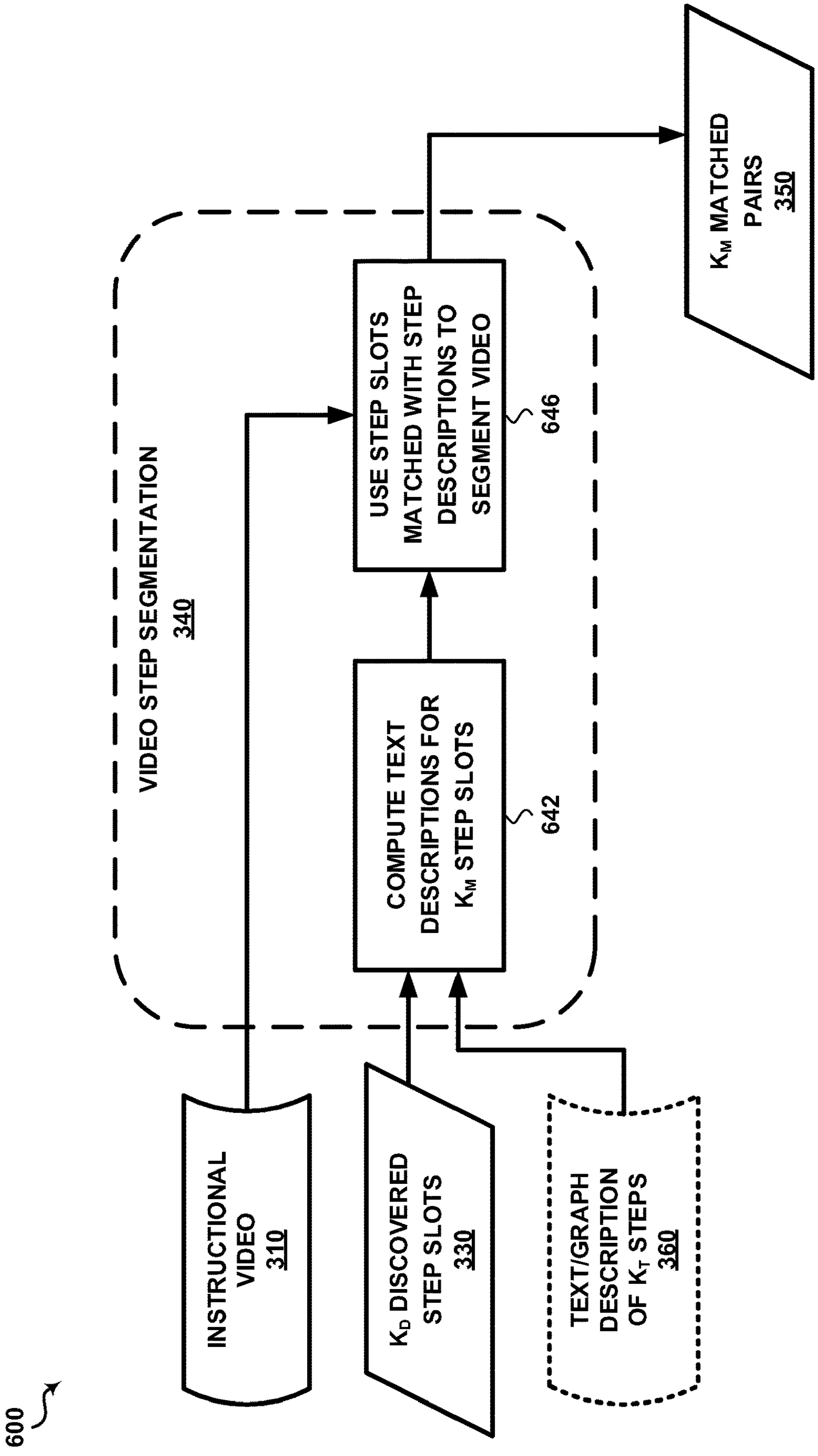
FIG. 6 illustrates an example process for a video step segmentation component, in accordance with various aspects of the present disclosure.

FIG. 6 illustrates an example process for a video step segmentation component, in accordance with various aspects of the present disclosure. Referring to FIG. 6, a process 600 of the video step segmentation component 340 that implements one or more aspects of the present disclosure is illustrated.

In some embodiments, at least a portion of the process 600 of the video step segmentation component 340 may be implemented by at least one of the device 100 of FIG. 1 and the device 220 of FIG. 2, which may include the step discovery and localization component 180. Alternatively or additionally, another computing device (e.g., a server, a laptop, a smartphone, a UE, a wearable device, a smart device, an IoT device, and the like) that includes the step discovery and localization component 180 may implement at least a portion of the process 600 of the video step segmentation component 340. In some optional or additional embodiments, the process 600 of the video step segmentation component 340 may be implemented by at least one of the device 100 of FIG. 1 and the device 220 of FIG. 2 in conjunction with another computing device (e.g., a server, a laptop, a smartphone, a UE, a wearable device, a smart device, an IoT device, and the like). In such embodiments, the device (e.g., device 100 of FIG. 1, device 220 of FIG. 2) may be communicatively coupled to the other computing device via a wired and/or wireless communication channel using the communication interface 170.

As shown in FIG. 6, the video step segmentation component 340 may compute text descriptions for $K_M$ step slots, in operation 642. For example, the video step segmentation component 340 may compute the text descriptions based at least on the plurality of $K_D$ discovered step slots 330. In an embodiment, the video step segmentation component 340 may obtain the plurality of $K_D$ discovered step slots 330 from the step discovery component 320. In an optional or additional embodiment, the video step segmentation component 340 may compute the text descriptions further based on the plurality of $K_T$ text descriptions 360. The plurality of $K_T$ text descriptions 360 may be in the form of an ordered list of step descriptions and/or in the form of a procedure graph. The video step segmentation component 340 may access the plurality of $K_T$ text descriptions 360 using the storage component 140 and/or may obtain the plurality of $K_T$ text descriptions 360 from another computing device (e.g., a server, a laptop, a smartphone, a UE, a wearable device, a smart device, an IoT device, and the like) via a wired and/or wireless communication using the communication interface 170. Operation 642 of the process 600 is further described with reference to FIG. 7.

In operation 646, the video step segmentation component 340 may use at least a portion of the plurality of $K_D$ discovered step slots 330 that have been matched with the text step descriptions computed in operation 642 to segment the instructional video 310. The resulting video segments with the corresponding text step descriptions may be and/or may include the plurality of matched pairs 350, as shown in FIG. 6. In an embodiment, the video step segmentation component 340 may delete a step slot from the plurality of $K_D$ discovered step slots 330 that fails to match with the plurality of video segments of the instructional video 310. In an optional or additional embodiment, the video step segmentation component 340 may delete a step slot from the plurality of $K_D$ discovered step slots 330 matched with a video segment excluding the plurality of procedure steps depicted in the instructional video 310.

In an embodiment, the video step segmentation component 340 may a sequence-to-sequence alignment model to infer a relationship between the sequence of $K_D$ discovered step slots 330 and the sequence of video segments of the instructional video 310. In an optional or additional embodiment, aligning of the two sequences (e.g., the sequence of $K_D$ discovered step slots 330 and the sequence of video segments of the instructional video 310) may include calculating an optimal pairwise correspondence between the sequence elements, which may preserve their match orderings. Therefore, given the sequence of sequence of $K_D$ discovered step slots 330 and the sequence of video segments of the instructional video 310, which both follow a temporal order, step localization may be realized by aligning the sequences and determining a correspondence between the video segments and the discovered step slots.

In an embodiment, the sequence-to-sequence alignment model may input two vector sequences (e.g., $x \in \mathbb{R}^{N \times d}$ and $z \in \mathbb{R}^{K \times d}$) and/or may output a binary alignment matrix M having a size of K×d (e.g., $M \in \mathbb{R}^{K \times d}$). Each element of the binary alignment matrix M may indicate that elements $z_i$ and $x_j$ are matched when $M_{ij}=1$. Alternatively or additionally, each element of the binary alignment matrix M may indicate that elements $z_i$ and $x_j$ are not matched when $M_{ij}=0$.

In an optional or additional embodiment, the sequence-to-sequence alignment model may assign a cost when matching a pair of sequence elements and/or may assign another cost when dropping an element from at least one sequence. For example, the cost of matching two elements may be defined by a negative cosine similarity of the two sequence elements. Alternatively or additionally, the cost of dropping an element may be defined as a percentile of the match cost distribution. The sequence-to-sequence alignment model may compute the alignment in such a manner that a total cost (e.g., matching cost and dropping cost) may be minimized.

In an embodiment, the sequence-to-sequence alignment model may be and/or may include a Drop-Dynamic Time Warping (Drop-DTW) algorithm. However, the present disclosure is not limited in this regard. Notably, the present disclosure may employ another algorithm and/or model that may operate on sequences of continuous vectors (e.g., video and text embeddings), may automatically detect and drop outliers from one or both sequences, and may support both one-to-one and many-to-one matching. For example, a formulation of the sequence-to-sequence alignment model that may allow for many-to-one correspondences may be used during an inference mode of the sequence-to-sequence alignment model such that the sequence-to-sequence alignment model may assign multiple video frames (e.g., segments) to a single step slot in order to effectively segment the video into steps. Alternatively or additionally, another formulation of the sequence-to-sequence alignment model that may allow for one-to-one matching may be used during a training mode of the sequence-to-sequence alignment model to facilitate the creation of the binary alignment matrix M. The sequence-to-sequence alignment model is further described with reference to FIG. 8.

Related approaches for selecting a subset of the step slots that may concisely describe an instructional video may utilize a hard attention technique to extract step segments from the instructional video, for example. However, such related approaches may not properly account for duplicate and/or may ignore the temporal order of the step slots. Advantageously, the aspects presented herein provide for dropping of irrelevant step slots from instructional videos and/or provide for generating a temporally ordered sequence of step slots. Thus, the present disclosure may provide an improved segmentation quality when compared to related approaches. Notably, since the video and text features used by the aspects presented herein share a common embedding space, the step slots and the video segments may be aligned effectively.

Figure 7:
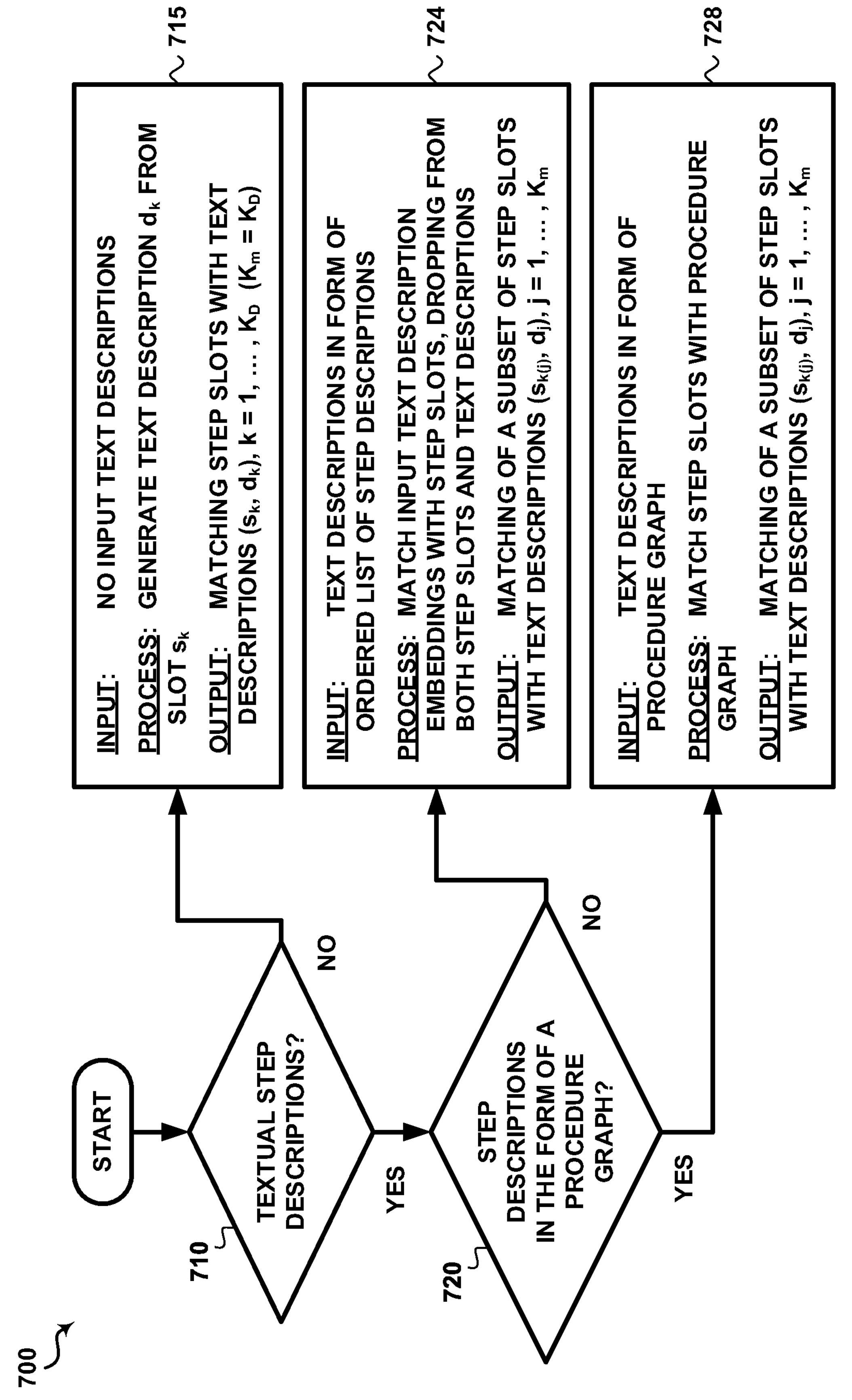
FIG. 7 depicts an example process for video step segmentation, in accordance with various aspects of the present disclosure.

FIG. 7 depicts an example process for video step segmentation, in accordance with various aspects of the present disclosure. Referring to FIG. 7, a process 700 of the operation 642 of the process 600 performed by the video step segmentation component 340 that implements one or more aspects of the present disclosure is illustrated.

In some embodiments, at least a portion of the process 700 of the video step segmentation component 340 may be implemented by at least one of the device 100 of FIG. 1 and the device 220 of FIG. 2, which may include the step discovery and localization component 180. Alternatively or additionally, another computing device (e.g., a server, a laptop, a smartphone, a UE, a wearable device, a smart device, an IoT device, and the like) that includes the step discovery and localization component 180 may implement at least a portion of the process 700 of the video step segmentation component 340. In some optional or additional embodiments, the process 700 of the video step segmentation component 340 may be implemented by at least one of the device 100 of FIG. 1 and the device 220 of FIG. 2 in conjunction with another computing device (e.g., a server, a laptop, a smartphone, a UE, a wearable device, a smart device, an IoT device, and the like). In such embodiments, the device (e.g., device 100 of FIG. 1, device 220 of FIG. 2) may be communicatively coupled to the other computing device via a wired and/or wireless communication channel using the communication interface 170.

In operation 710, the video step segmentation component 340 may determine whether the plurality of $K_T$ text descriptions 360 have been provided and/or whether the video step segmentation component 340 has access to the plurality of $K_T$ text descriptions 360 for the instructional video 310. When the video step segmentation component 340 determines that the plurality of $K_T$ text descriptions 360 has not been provided and/or that the video step segmentation component 340 is unable to access the plurality of $K_T$ text descriptions 360 (NO in operation 710), the process 700 may proceed to operation 715. The video step segmentation component 340 may, in operation 715, generate a text description $d_K$ for each step slot $s_K$ of the plurality of $K_D$ discovered step slots 330. For example, the video step segmentation component 340 may generate a temporally-ordered list of step slots $s_K$ with embedded text descriptions $d_K$ that match the step slots (e.g., $(s_K, d_K)$, k=1, . . . , $K_D$, where $K_D=K_M$). In an embodiment, the embedded text descriptions $d_K$ that may share a common embedding space with the video clips of the instructional video 310. For example, a video clip of whipping eggs and the phrase "whip eggs" may map to similar embedding vectors. Consequently, the step slots $s_K$ may be aligned (e.g., matched) with the video clips of the instructional video 310 given that the video and text features share a common embedding space.

When the video step segmentation component 340 determines that the plurality of $K_T$ text descriptions 360 has been provided and/or that the video step segmentation component 340 has accessed the plurality of $K_T$ text descriptions 360 (YES in operation 710), the process 700 may proceed to operation 720. In operation 720, the video step segmentation component 340 may determine whether the plurality of $K_T$ text descriptions 360 is in the form of a procedure graph.

When the video step segmentation component 340 determines that the plurality of $K_T$ text descriptions 360 is not in the form of the procedure graph (NO at operation 720), the process 700 may proceed to operation 724. In operation 724, the video step segmentation component 340 may determine that the plurality of $K_T$ text descriptions 360 is in the form of an ordered list of step descriptions. In an embodiment, the video step segmentation component 340 may, in operation 724, match the provided plurality of $K_T$ text descriptions 360 with the plurality of $K_D$ discovered step slots 330. For example, the video step segmentation component 340 may use a sequence-to-sequence alignment model to match the provided plurality of $K_T$ text descriptions 360 with the plurality of $K_D$ discovered step slots 330 and to drop (e.g., remove) outliers (e.g., duplicate step slots, step slots that do not have a match, step slots that have a weak match that does not meet a threshold, and the like) from the plurality of $K_T$ text descriptions 360 and the plurality of $K_D$ discovered step slots 330. That is, in operation 724, the video step segmentation component 340 may generate a temporally-ordered list of step slots $s_{k(j)}$ with embedded text descriptions $d_j$ that match the step slots (e.g., $(s_{k(j)}, d_j)$, j=1, . . . , $K_M$, where $K_M \leq K_D$).

When the video step segmentation component 340 determines that the plurality of $K_T$ text descriptions 360 is in the form of the procedure graph (YES at operation 720), the process 700 may proceed to operation 728. In operation 728, the video step segmentation component 340 may match the provided procedure graph with the plurality of $K_D$ discovered step slots 330. For example, the video step segmentation component 340 may use a sequence-to-sequence alignment model to match the provided procedure graph with the plurality of $K_D$ discovered step slots 330 and to drop (e.g., remove) outliers (e.g., duplicate step slots, step slots that do not have a match, step slots that have a weak match that does not meet a threshold, and the like) from the provided procedure graph and the plurality of $K_D$ discovered step slots 330. That is, in operation 728, the video step segmentation component 340 may generate a temporally-ordered list of step slots $s_{k(j)}$ with embedded text descriptions $d_j$ that match the step slots (e.g., $(s_{k(j)}, d_j)$, j=1, . . . , $K_M$, where $K_M \leq K_D$).

As described above, in operations 715, 724, and 728, the video step segmentation component 340 may output a set of pairs (e.g., $(s_{k(j)}, d_j)$, j=1, . . . , $K_M$). That is, for a subset of step slots, the video step segmentation component 340 may embed associated text descriptions $d_j$. The set of pairs may be processed according to operation 646 to generate the plurality of matched pairs 350, as described with reference to FIG. 6

Figure 8:
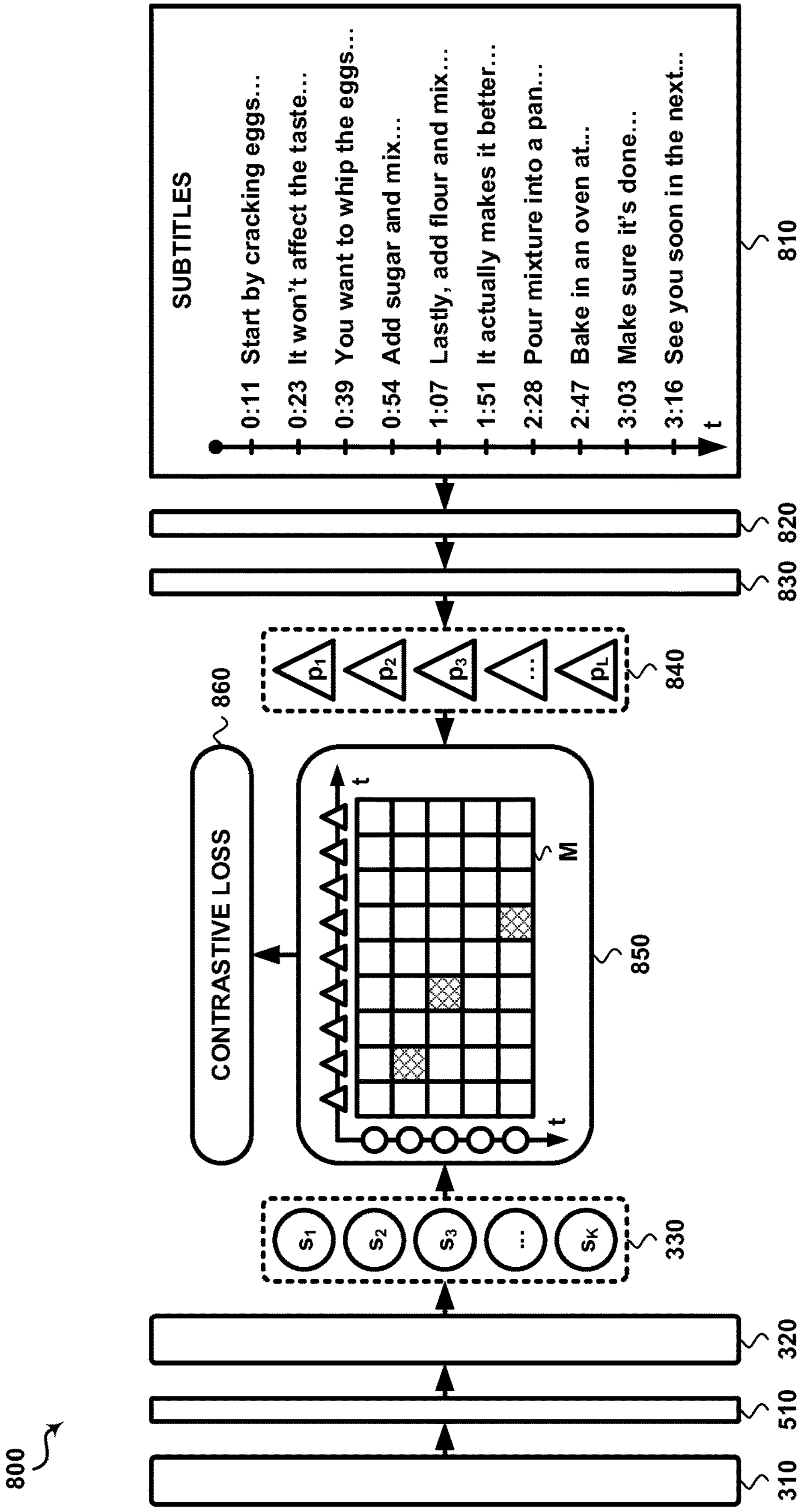
FIG. 8 illustrates an example training process for step discovery and localization, in accordance with various aspects of the present disclosure.

FIG. 8 illustrates an example training process for step discovery and localization, in accordance with various aspects of the present disclosure. Referring to FIG. 8, the training process 800 may implement one or more aspects of the present disclosure.

In some embodiments, at least a portion of the training process 800 may be performed by at least one of the device 100 of FIG. 1 and the device 220 of FIG. 2, which may include the step discovery and localization component 180. Alternatively or additionally, another computing device (e.g., a server, a laptop, a smartphone, a UE, a wearable device, a smart device, an IoT device, and the like) that includes the step discovery and localization component 180 may perform at least a portion of the training process 800. In some optional or additional embodiments, the training process 800 may be performed by at least one of the device 100 of FIG. 1 and the device 220 of FIG. 2 in conjunction with another computing device (e.g., a server, a laptop, a smartphone, a UE, a wearable device, a smart device, an IoT device, and the like). In such embodiments, the device (e.g., device 100 of FIG. 1, device 220 of FIG. 2) may be communicatively coupled to the other computing device via a wired and/or wireless communication channel using the communication interface 170.

In an embodiment, a large-scale instructional video dataset (e.g., HowTo100M) may be used to train the step discovery component 320 and the video step segmentation component 340. The instructional videos in the dataset may include an audio track consisting of a natural narration provided by people (e.g., instructors) in the video as they execute the procedure. Since the audio narration may be naturally provided with the dataset, the audio narration may not considered to be an annotation. That is, both the video and audio tracks may be used and considered self supervised learning.

As shown in FIG. 8, an instructional video 310 may be encoded by a video encoder 510. For example, the instructional video 310 may be and/or may include an instructional video from a large-scale instructional video dataset (e.g., HowTo100M). The video encoder 510 may be and/or may include a pre-trained video and language encoder (e.g., UniVL). In an embodiment, the video encoder 510 may be configured to embed video captions to the instructional video 310. That is, as described above with reference to FIG. 5, the video encoder 510 may annotate video clips of the instructional video 310 with at least one captioning sentence. The video captions may be descriptive of the content of each video clip of the instructional video 310. Consequently, the video encoder 510 may annotate the instructional video 310 without a need for narrations, captions, and the like to be already included in the instructional video 310. As further described with reference to FIG. 5, the step discovery component 320 may output a plurality of discovered step slots 330 (e.g., a K×d dimensional matrix that may be denoted by S, $S \in \mathbb{R}^{K \times d}$).

To form training targets for the step discovery component 320 (e.g., transformer model $\mathcal{T}$ 524) using the narration of the instructional video 310, the speech in the instructional video 310 may be transformed to text using automatic speech recognition (ASR), such as, but not limited to YouTube ASR. In an embodiment, subtitles 810 may be generated from the instructional video 310 using an ASR algorithm. The subtitles 810 may be processed by a verb-phrase extraction component 820. The verb-phrase extraction component 820 may run the subtitles 810 through one or more modules that may include a punctuation module and a co-reference resolution module. Alternatively or additionally, the verb-phrase extraction component 820 may run the subtitles 810 through a dependency parser module to discover verb-phrases of the form "verb+(prt)-dobj+(prep+pobj)", where "prt" may refer to a phrasal verb particle (e.g., shut, down), "dobj" may refer to a direct object, "prep" may refer to a prepositional modifier, and pobj may refer to the object of a preposition. That is, the subtitles 810 may be transformed into an ordered sequence of L verb phrases, which may describe visually groundable actions and/or procedure steps occurring in the instructional video 310.

Continuing to refer to FIG. 8, the L verb phrases generated by the verb-phrase extraction component 820 may be provided to a text encoder 830, that may be similar in many respects to the video encoder 510, to extract features from the L verb phrases. That is, using the video encoder 510, the instructional video 310 may be mapped to a sequence of N vectors, $V \in \mathbb{R}^{N \times d}$, and/or using the text encoder 830, the L verb phrases may be mapped to a sequence of L feature vectors, $P \in \mathbb{R}^{L \times d}$. For example, as shown in FIG. 8, the step discovery component 320 may output a K×d dimensional matrix that may be denoted by S (e.g., $S \in \mathbb{R}^{K \times d}$), whose K rows may be the plurality of discovered step slots 330 (e.g., first discovered step slot $s_1$, second discovered step slot $s_2$, third discovered step slot $s_3$, . . . , K-th discovered step slot $s_K$). For another example, as shown in FIG. 8, the text encoder 830 may output an L×d dimensional matrix that may be denoted by P (e.g., $P \in \mathbb{R}^{L \times d}$), whose L rows may be feature vectors for the embedded L verb phrases (e.g., first verb phrase $p_1$, second verb phrase $p_2$, third verb phrase $p_3$, . . . , K-th verb phrase $p_K$).

The feature vectors for the video and text embeddings may share a common embedding space since a similar algorithm may be used to encode the video embeddings (e.g., V) and the text embeddings (e.g., P). For example, a video of cutting a tomato and the phrase "cutting a tomato" may map to similar feature vectors. Consequently, the present disclosure may provide for training of the step discovery component 320 and the video step segmentation component 340 even in the presence of noise (e.g., uninformative content) in the narrations (e.g., subtitles).

In an embodiment, the training of the step discovery component 320 and the video step segmentation component 340 may be supervised by finding a matching subsequence between the sequence of step slots 330 and the sequence of verb phrases 840, using a sequence-to-sequence alignment model 850. For example, the sequence-to-sequence alignment model 850, which may include and/or may be similar in many respects to the sequence-to-sequence alignment model of the video step segmentation component 340, may generate a binary alignment matrix M that may denote correspondences between the sequence of step slots 330 and the verb phrases 840. The resulting alignment may be used to define a contrastive training loss 860 that may be used to train the step discovery component 320 and the video step segmentation component 340.

The output of the step discovery component 320 (e.g., the sequence of step slots 330, $S \in \mathbb{R}^{K \times d}$) may be supervised using the sequence of verb phrase embeddings 840 (e.g., $P \in \mathbb{R}^{L \times d}$). For example, the step slots 330 may be aligned with the verb phrase embeddings 840 using the sequence-to-sequence alignment model 850. As a result, verb phrases and step slots that do not have strong match (e.g., match is below a threshold) may be dropped from further consideration, and may enforce only one-to-one correspondences between the verb phrases and the step slots that are a good match (e.g., a single step slot $s_i$ may match with a maximum of one verb phrase $p_j$, and/or a single verb phrase $p_j$ may match with a maximum of one step slot $s_i$). The resulting correspondence matrix M may be used to construct positive and negative pairs, which may be used in a contrastive training setting. As shown in FIG. 8, the correspondence matrix M may form a positive training pair (e.g., $M_{ij}=1$) for every matched pair of step slot $s_i$ and verb phrase $p_j$ (e.g., indicated in FIG. 8 by a shaded rectangle) and/or may form negative training pairs (e.g., $M_{ij}=0$) for all other non-matching pairs (e.g., indicated in FIG. 8 by empty (e.g., white) rectangles).

In an embodiment, a contrastive training loss 860 that may promote the similarity between positive pairs, and may push the negative pairs away from each other, may be calculated using the following equation:

$$\ell_{NCE}(s_i, p) = -\log\frac{f(s_i, p_{j^*})}{f(s_i, p_{j^*}) + \sum_{j\neq j^*} f(s_i, p_j)} \quad \text{(Eq. 1)}$$

Referring to Eq. 1, $f(x, z)=\exp(\cos(x, z)/\gamma$, where $\gamma$ represents a scaling temperature, and j* may represent the index of the $s_i$'s positive pair.

In an optional or additional embodiment, a full sequence-to-sequence alignment loss $\mathcal{L}_{seq}$ may refer to a combination of two losses, in which one loss may be contrasting the step slots 330 and the other loss may be contrasting the verb phrases 840. For example, the full sequence-to-sequence alignment loss $\mathcal{L}_{seq}$ may be calculated using the following equation:

$$\mathcal{L}_{seq} = \frac{1}{K}\sum_{i=1}^{K}\ell_{NCE}(s_i, p) + \frac{1}{N}\sum_{j=1}^{L}\ell_{NCE}(p_j, s) \quad \text{(Eq. 2)}$$

The full sequence-to-sequence alignment loss $\mathcal{L}_{seq}$ of Eq. 2 used for contrastive learning may learn from positive training pairs and from negative training pairs. However, contrastive learning may be further improved by using a large and diverse set of negative training pairs. To that end, an additional contrastive loss that forms negative pairs from verb phrases and step slots that come from different videos may be added. That is, given an instructional video 310, some of the extracted step slots 330 must match with some verb phrases of the instructional video 310, regardless of the order, while at the same time, the step slots and verb phrases coming from other instructional videos should be different.

To realize the global contrastive loss, a contrastive multiple-instance-learning objective may be used that may promote the similarity between sets of step slots and verb phrases belonging to the same instructional video, and that may contrast the sets of step slots and verb phrases belonging to different videos. In an embodiment, the global contrastive loss may be calculated using the following equation:

$$\mathcal{L}_{global} = -\log\frac{1}{M}\sum_{i=1}^{M}\frac{\sum_{j\in\mathcal{P}_i} f(s_i, p_j)}{\sum_{j\in\mathcal{P}_i} f(s_i, p_j) + \sum_{j\in\mathcal{N}_i} f(s_i, p_j)} \quad \text{(Eq. 3)}$$

Referring to Eq. 3, $f(x, z)=\exp(\cos(x, z)/\gamma$, where $\gamma$ represents a scaling temperature, M=K·B represents the total number of step slots across the batch size of B, $\mathcal{P}_i$ represents the set of indexes j that form a positive pair with $s_i$ (e.g., the $p_j$ coming from the same instructional video), and $\mathcal{N}_j$ represents the set of indexes j that form a negative pair with $s_i$ (e.g., the $p_j$ coming from a different instructional video). Advantageously, using the global contrastive loss may discourage step slots representing non-procedural (e.g., uninformative) steps appearing across the instructional videos, thus, potentially improving the accuracy of the matched pairs 350.

In an optional or additional embodiment, two additional regularizers may act on the step slots in order to introduce prior knowledge into the training system and to potentially improve the training process 800. For example, a first regularizer may enforce diversity amongst the step slots and encourage that the step slots predicted from one instructional video be different from one another, thus avoiding duplicate step slots. That is, a regularization term $\mathcal{L}_{div}$ may be configured to increase a low cosine similarity among the step slots of a same instructional video, and thereby, potentially increasing diversity among the step slots.

Alternatively or additionally, a second regularizer may enforce attention smoothness. That is, an expectation of natural video continuity may dictate that the attention of the step slots in the instructional video may change smoothly and/or that the attention may be similar for close frames. Thus, a regularization term $\mathcal{L}_{smooth}$ may be added to enforce that, for all step slots, the attention in the instructional video may be similar for neighboring frames and may different for distant frames.

Accordingly, the training process 800 may train the step discovery component 320 and the video step segmentation component 340 to optimize the weighted sum of the above-described losses using the following equation:

$$\mathcal{L}_{total} = \mathcal{L}_{seq} + \mathcal{L}_{global} + \alpha\mathcal{L}_{div} + \beta\mathcal{L}_{smooth} \quad \text{(Eq. 4)}$$

Referring to Eq. 4, $\alpha$ and $\beta$ represent scaling factors that may be determined using cross validation.

Related techniques for temporally localizing key-steps from instructional videos may rely on some sort of supervision during and/or after training. For example, fully supervised approaches may require start and end times of each step. Alternatively or additionally, weakly supervised approaches may rely on knowledge of steps present in the video in the form of at least one of an ordered sequence of step descriptions, a partially ordered steps captured in a graph, and an unordered set of steps. Other related unsupervised approaches may attempt to directly detect and localize key-steps without relying on a priori knowledge of the instructional steps. These related unsupervised approaches may be preferable when attempting to process a large dataset, as these related approaches may not require expensive labeling efforts. However, these related unsupervised approaches may require either a video-level task label and/or additional step information even after training, thereby limiting their broad applicability. Advantageously, the aspects described above with reference to FIGS. 1 to 8 provide for a zero-shot multiple step discovery and localization given an instructional video of a task procedure.

Figure 9:
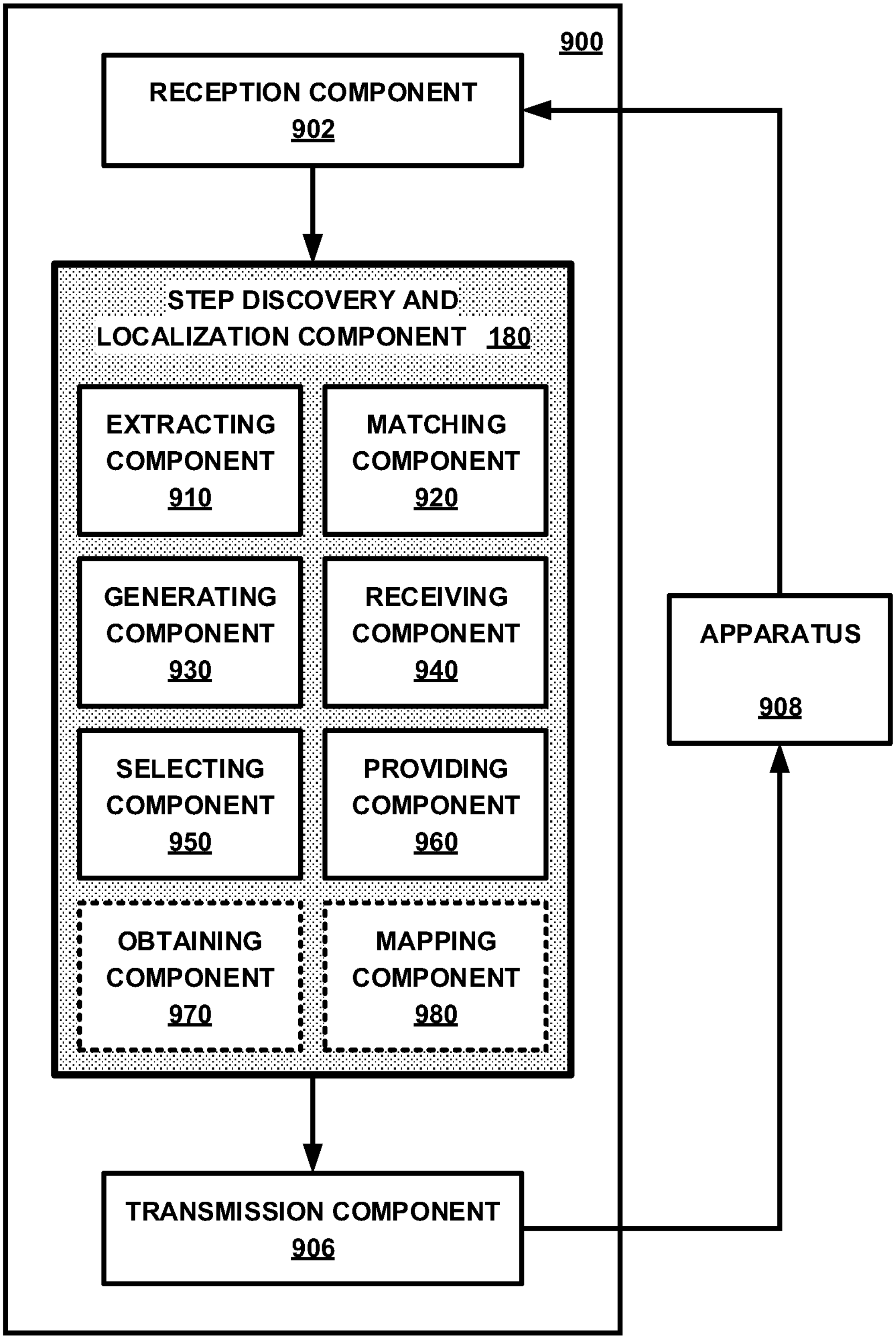
FIG. 9 depicts a block diagram of an example apparatus for step discovery and localization, in accordance with various aspects of the present disclosure.

FIG. 9 depicts a block diagram of an example apparatus for step discovery and localization, in accordance with various aspects of the present disclosure. The apparatus 900 may be a computing device (e.g., device 100 of FIG. 1, device 220 of FIG. 2) and/or a computing device may include the apparatus 900. In some embodiments, the apparatus 900 may include a reception component 902 configured to receive communications (e.g., wired, wireless) from another apparatus (e.g., apparatus 908), a step discovery and localization component 180 configured to perform step discovery and localization, and a transmission component 906 configured to transmit communications (e.g., wired, wireless) to another apparatus (e.g., apparatus 908). The components of the apparatus 900 may be in communication with one another (e.g., via one or more buses or electrical connections). As shown in FIG. 9, the apparatus 900 may be in communication with another apparatus 908 (such as, but not limited to, a server, a laptop, a smartphone, a UE, a wearable device, a smart device, an IoT device, and the like) using the reception component 902 and/or the transmission component 906.

In some embodiments, the apparatus 900 may be configured to perform one or more operations described herein in connection with FIGS. 1 to 7. Alternatively or additionally, the apparatus 900 may be configured to perform one or more processes described herein, such as method 1000 of FIG. 10. In some embodiments, the apparatus 900 may include one or more components of the device 100 described with reference to FIG. 1.

The reception component 902 may receive communications, such as control information, data communications, or a combination thereof, from the apparatus 908 (e.g., a server, a laptop, a smartphone, a UE, a wearable device, a smart device, an IoT device, and the like). The reception component 902 may provide received communications to one or more other components of the apparatus 900, such as the step discovery and localization component 180. In some embodiments, the reception component 902 may perform signal processing on the received communications, and may provide the processed signals to the one or more other components. In some embodiments, the reception component 902 may include one or more antennas, a receive processor, a controller/processor, a memory, or a combination thereof, of the device 100 described with reference to FIG. 1.

The transmission component 906 may transmit communications, such as control information, data communications, or a combination thereof, to the apparatus 908 (e.g., a server, a laptop, a smartphone, a UE, a wearable device, a smart device, an IoT device, and the like). In some embodiments, the step discovery and localization component 180 may generate communications and may transmit the generated communications to the transmission component 906 for transmission to the apparatus 908. In some embodiments, the transmission component 906 may perform signal processing on the generated communications, and may transmit the processed signals to the apparatus 908. In other embodiments, the transmission component 906 may include one or more antennas, a transmit processor, a controller/processor, a memory, or a combination thereof, of the device 100 described with reference to FIG. 1. In some embodiments, the transmission component 906 may be co-located with the reception component 902 such as in a transceiver and/or a transceiver component.

The step discovery and localization component 180 may be configured to perform step discovery and localization. In some embodiments, the step discovery and localization component 180 may include a set of components, such as an extracting component 910 configured to extract a plurality of step slots from an instructional video, a matching component 920 configured to match a plurality of video segments of the instructional video to the plurality of step slots, a generating component 930 configured to generate a temporally-ordered plurality of video segments, a receiving component 940 configured to receive a user query requesting a procedure step, a selecting component 950 configured to select a corresponding video segment corresponding to the requested procedure step, and a providing component 960 configured to provide the corresponding video segment and the matching textual step description of the corresponding video segment.

In optional or additional embodiments, the set of components of the step discovery and localization component 180 may further include additional components, such as an obtaining component 970 configured to obtain plurality of textual step descriptions of the instructional video, and a mapping component 980 configured to map the plurality of video segments and the user query into feature vectors in a shared embedding space.

In some embodiments, the set of components may be separate and distinct from the step discovery and localization component 180. In other embodiments, one or more components of the set of components may include and/or may be implemented within a controller/processor (e.g., the processor 120), a memory (e.g., the memory 130), or a combination thereof, of the device 100 described with reference to FIG. 1. Alternatively or additionally, one or more components of the set of components may be implemented at least in part as software stored in a memory, such as the memory 130 of FIG. 1. For example, a component (or a portion of a component) may be implemented as computer-executable instructions and/or code stored in a computer-readable medium (e.g., a non-transitory computer-readable medium) and executed by a controller or a processor to perform the functions and/or operations of the component.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIGS. 1 to 8.

Referring to FIG. 10, in operation, an apparatus 900 may perform a method 1000 of step discovery and localization. The method 1000 may be performed by the device 100 (which may include the processor 120, the memory 130, and the storage component 140, and which may be the entire device 100 and/or include one or more components of the device 100, such as the input component 150, the output component 160, the communication interface 170, and/or the step discovery and localization component 180) and/or the apparatus 900. The method 1000 may be performed by the device 100, the device 220, the apparatus 900, and/or the step discovery and localization component 180 in communication with the apparatus 908 (e.g., a server, a laptop, a smartphone, a UE, a wearable device, a smart device, an IoT device, and the like).

At block 1010 of FIG. 10, the method 1000 may include extracting, from the instructional video using a transformer model, a plurality of step slots corresponding to a plurality of procedure steps depicted in the instructional video. For example, in an aspect, the device 100, the step discovery and localization component 180, and/or the extracting component 910 may be configured to and/or may include means for extracting, from the instructional video 310 using a transformer model 524, a plurality of step slots 330 corresponding to a plurality of procedure steps depicted in the instructional video 310.

For example, the extracting at block 1010 may include extracting, from the instructional video using the transformer model 524, the plurality of step slots 330 corresponding to the plurality of procedure steps depicted in the instructional video 310, as described above with reference to FIG. 5. In an embodiment, the transformer model 524 may have been acquired by machine learning using a plurality of instructional videos 310 and supervised using automatically generated narrations of the plurality of instructional videos 310, as described above with reference to FIG. 8.

Further, for example, the extracting at block 1010 may be performed to generate a plurality of step slots 330 that may be semantically meaningful and may be aligned (e.g., matched) with steps described in a separate textual description of a procedure. That is, the plurality of step slots 330 may provide information about the key-steps depicted in an instructional video 310, along with information suitable for temporal segmentation of the instructional video 310 into the key-steps (e.g., removing uninformative portions of the instructional video 310), as well as semantic information about what is being done in each step.

At block 1020 of FIG. 10, the method 1000 may include matching, using an order-aware sequence-to-sequence alignment model, a plurality of video segments of the instructional video to the plurality of step slots. For example, in an aspect, the device 100, the step discovery and localization component 180, and/or the matching component 920 may be configured to and/or may include means for matching, using an order-aware sequence-to-sequence alignment model 340, a plurality of video segments of the instructional video to the plurality of step slots 330.

For example, the matching at block 1020 may include matching the plurality of video segments of the instructional video and the plurality of textual step descriptions of the instructional video to the plurality of step slots, as described above with reference to FIG. 6.

In optional or additional embodiments, the matching at block 1020 may include deleting a step slot from the plurality of step slots that fails to match with the plurality of video segments of the instructional video.

In optional or additional embodiments, the matching at block 1020 may include deleting a step slot from the plurality of step slots matched with a video segment excluding the plurality of procedure steps depicted in the instructional video.

Further, for example, the matching at block 1020 may be performed to drop irrelevant step slots from instructional videos and/or provide for generating a temporally ordered sequence of step slots. Thus, the matching at block 1020 may provide an improved segmentation quality when compared to related approaches. Notably, since the video and text features used by the aspects presented herein share a common embedding space, the step slots and the video segments may be aligned effectively.

At block 1030 of FIG. 10, the method 1000 may include generating a temporally-ordered plurality of video segments from the plurality of video segments, each video segment of the temporally-ordered plurality of video segments having a matching textual step description. For example, in an aspect, the device 100, the step discovery and localization component 180, and/or the generating component 930 may be configured to and/or may include means for generating a temporally-ordered plurality of video segments 350 from the plurality of video segments, each video segment of the temporally-ordered plurality of video segments 350 having a matching textual step description.

For example, the generating at block 1030 may include generating the temporally-ordered plurality of video segments from the plurality of video segments, according to the procedure graph.

At block 1040 of FIG. 10, the method 1000 may include receiving a user query requesting a procedure step. For example, in an aspect, the device 100, the step discovery and localization component 180, and/or the receiving component 940 may be configured to and/or may include means for receiving a user query 215 requesting a procedure step.

For example, the receiving at block 1040 may include processing the command 215 (or query) from the user 210, as described above with reference to FIG. 2.

At block 1050 of FIG. 10, the method 1000 may include selecting, from the plurality of video segments of the instructional video, a corresponding video segment corresponding to the requested procedure step. For example, in an aspect, the device 100, the step discovery and localization component 180, and/or the selecting component 950 may be configured to and/or may include means for selecting, from the plurality of video segments of the instructional video 310, a corresponding video segment corresponding to the requested procedure step.

For example, the selecting at block 1050 may include selecting a relevant video segment corresponding to the identified instruction step, as described above with reference to FIG. 2.

At block 1060 of FIG. 10, the method 1000 may include providing, in response to the user query, the corresponding video segment and the matching textual step description of the corresponding video segment. For example, in an aspect, the device 100, the step discovery and localization component 180, and/or the providing component 960 may be configured to and/or may include means for providing, in response to the user query 215, the corresponding video segment and the matching textual step description of the corresponding video segment.

For example, the providing at block 1060 may include providing, in response to the user query, the corresponding video segment and the matching textual step description from among the plurality of textual step descriptions.

In an optional or additional aspect that may be combined with any other aspects, the method 1000 may further include obtaining a plurality of textual step descriptions of the instructional video. For example, in an aspect, the device 100, the step discovery and localization component 180, and/or the obtaining component 970 may be configured to and/or may include means for obtaining a plurality of textual step descriptions of the instructional video.

In an optional or additional aspect that may be combined with any other aspects, the method 1000 may further include obtaining a procedure graph indicating an ordered list of the plurality of procedure steps depicted in the instructional video. For example, in an aspect, the device 100, the step discovery and localization component 180, and/or the obtaining component 970 may be configured to and/or may include means for obtaining a procedure graph indicating an ordered list of the plurality of procedure steps depicted in the instructional video.

In an optional or additional aspect that may be combined with any other aspects, the method 1000 may further include mapping the plurality of video segments and the user query into feature vectors in a shared embedding space. For example, in an aspect, the device 100, the step discovery and localization component 180, and/or the mapping component 980 may be configured to and/or may include means for mapping the plurality of video segments and the user query into feature vectors in a shared embedding space.

In such an optional or additional aspect, the method 1000 may further include selecting the corresponding video segment having a first feature vector that minimizes a distance to a second feature vector of the user query as the corresponding video segment corresponding to the requested procedure step. For example, in such an aspect, the device 100, the step discovery and localization component 180, and/or the selecting component 950 may be configured to and/or may include means for selecting the corresponding video segment having a first feature vector that minimizes a distance to a second feature vector of the user query as the corresponding video segment corresponding to the requested procedure step.

The following aspects are illustrative only and aspects thereof may be combined with aspects of other embodiments or teaching described herein, without limitation.

Aspect 1 is a method of step discovery and localization in an instructional video, to be performed by a processor, that includes extracting, from the instructional video using a transformer model, a plurality of step slots corresponding to a plurality of procedure steps depicted in the instructional video. The method of Aspect 1 further includes matching, using an order-aware sequence-to-sequence alignment model, a plurality of video segments of the instructional video to the plurality of step slots. The method of Aspect 1 further includes generating a temporally-ordered plurality of video segments from the plurality of video segments. Each video segment of the temporally-ordered plurality of video segments has a matching textual step description. The method of Aspect 1 further includes receiving a user query requesting a procedure step. The method of Aspect 1 further includes selecting, from the plurality of video segments of the instructional video, a corresponding video segment corresponding to the requested procedure step. The method of Aspect 1 further includes providing, in response to the user query, the corresponding video segment and the matching textual step description of the corresponding video segment.

In Aspect 2, the method of Aspect 1 may include obtaining a plurality of textual step descriptions of the instructional video. The matching of the plurality of video segments of the instructional video to the plurality of step slots may include matching the plurality of video segments of the instructional video and the plurality of textual step descriptions of the instructional video to the plurality of step slots. The providing of the corresponding video segment may include providing, in response to the user query, the corresponding video segment and the matching textual step description from among the plurality of textual step descriptions.

In Aspect 3, the method of any of Aspects 1 or 2 may include obtaining a procedure graph indicating an ordered list of the plurality of procedure steps depicted in the instructional video. The generating of the temporally-ordered plurality of video segments from the plurality of video segments may include generating the temporally-ordered plurality of video segments from the plurality of video segments, according to the procedure graph.

In Aspect 4, the method of any of Aspects 1 to 3, may include extracting, from the instructional video using the transformer model, the plurality of step slots corresponding to the plurality of procedure steps depicted in the instructional video. The transformer model may have been acquired by machine learning using a plurality of instructional videos and supervised using automatically generated narrations of the plurality of instructional videos.

In Aspect 5, the method of any of Aspects 1 to 4, may include deleting a step slot from the plurality of step slots that may have failed to match with the plurality of video segments of the instructional video.

In Aspect 6, the method of any of Aspects 1 to 5, may include deleting a step slot from the plurality of step slots that may have been matched with a video segment excluding the plurality of procedure steps depicted in the instructional video.

In Aspect 7, the method of any of Aspects 1 to 6, may include mapping the plurality of video segments and the user query into feature vectors in a shared embedding space, and selecting the corresponding video segment having a first feature vector that may minimize a distance to a second feature vector of the user query as the corresponding video segment corresponding to the requested procedure step.

Aspect 8 is an apparatus for performing step discovery and localization in an instructional video. The apparatus includes a memory storing computer-executable instructions, and a processor communicatively coupled to the memory. The processor is configured to execute the computer-executable instructions and cause the apparatus to perform one or more of the methods of any of Aspects 1 to 7.

Aspect 9 is an apparatus for performing step discovery and localization in an instructional video including means to perform one or more of the methods of any of Aspects 1 to 7.

Aspect 10 is a non-transitory computer-readable storage medium storing computer-executable instructions for performing step discovery and localization in an instructional video. The computer-executable instructions are configured, when executed by at least one processor of a device, to cause the device to perform one or more of the methods of any of Aspects 1 to 7.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the terms “component,” “module,” “system” and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EEPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1 to 9) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, and the like, that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which includes one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and the like), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise. In addition, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment. As used herein, such terms as "1st" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations may be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Furthermore, the described features, advantages, and characteristics of the present disclosure may be combined in any suitable manner in one or more embodiments. One skilled in the relevant art may recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

What is claimed is:

1. A method of step discovery and localization in an instructional video, to be performed by a processor, comprising:

- embedding video captions to the instructional video and generating video features based on the video captions;
- generating, based on the video features using a transformer model, a plurality of step slots by inputting a predetermined number of learnable queries to the transformer model, wherein the number of step slots is equal to the predetermined number of learnable queries;
- detecting outliers from the plurality of step slots and excluding the outliers to identify at least one step slot remaining from the plurality of step slots, wherein the outliers comprise: (i) duplicate step slots, and (ii) step slots having a binding strength with a plurality of video segments of the instructional video less than a predetermined threshold;

matching, using an order-aware sequence-to-sequence alignment model, the identified at least one step slot to at least one video segment among the plurality of video segments of the instructional video by estimating start and end times of the at least one video segment corresponding to the identified at least one step slot;

generating a temporally-ordered plurality of video segments from the at least one video segment, each video segment of the temporally-ordered plurality of video segments having a matching textual step description;

receiving a user query requesting a procedure step;

selecting, from the temporally-ordered plurality of video segments of the instructional video, a corresponding video segment corresponding to the requested procedure step; and providing, in response to the user query, the corresponding video segment and the matching textual step description of the corresponding video segment.

2. The method of claim 1, further comprising:

obtaining at least one textual step description of the instructional video, wherein the matching of the identified at least one step slot to the at least one video segment among the plurality of video segments of the instructional video comprises matching the at least one video segment of the instructional video and the at least one textual step description of the instructional video to the identified at least one step slot, and wherein the providing of the corresponding video segment comprises providing, in response to the user query, the corresponding video segment and the matching textual step description from among the at least one textual step description.

3. The method of claim 1, further comprising:

obtaining a procedure graph indicating an ordered list of a plurality of procedure steps depicted in the instructional video, wherein the generating of the temporally-ordered plurality of video segments from the at least one video segment comprises generating the temporally-ordered plurality of video segments from the at least one video segment, according to the procedure graph.

4. The method of claim 1, wherein the generating of the plurality of step slots comprises:

generating, based on the video features using the transformer model, the plurality of step slots, the transformer model having been acquired by machine learning using a plurality of instructional videos and supervised using automatically generated narrations of the plurality of instructional videos.

5. The method of claim 1, wherein the matching of the identified at least one step slot to the at least one video segment among the plurality of video segments of the instructional video comprises:

deleting a step slot from the plurality of step slots that fails to match with the plurality of video segments of the instructional video.

6. The method of claim 1, further comprising:

mapping the plurality of video segments and the user query into feature vectors in a shared embedding space; and selecting the corresponding video segment having a first feature vector that minimizes a distance to a second feature vector of the user query as the corresponding video segment corresponding to the requested procedure step.

7. An apparatus for performing step discovery and localization in an instructional video, comprising:

a memory storing computer-executable instructions; and a processor communicatively coupled to the memory, wherein the processor is configured to execute the computer-executable instructions to:

embed video captions to the instructional video and generate video features based on the video captions;

generate, based on the video features using a transformer model, a plurality of step slots by inputting a predetermined number of learnable queries to the transformer model, wherein the number of step slots is equal to the predetermined number of learnable queries;

detect outliers from the plurality of step slots and exclude the outliers to identify at least one step slot remaining from the plurality of step slots, wherein the outliers comprise: (i) duplicate step slots, and (ii) step slots having a binding strength with a plurality of video segments of the instructional video less than a predetermined threshold;

match, using an order-aware sequence-to-sequence alignment model, the identified at least one step slot to at least one video segment among the plurality of video segments of the instructional video by estimating start and end times of the at least one video segment corresponding to the identified at least one step slot;

generate a temporally-ordered plurality of video segments from the at least one video segment, each video segment of the temporally-ordered plurality of video segments having a matching textual step description;

receive a user query requesting a procedure step;

select, from the temporally-ordered plurality of video segments of the instructional video, a corresponding video segment corresponding to the requested procedure step; and provide, in response to the user query, the corresponding video segment and the matching textual step description of the corresponding video segment.

8. The apparatus of claim 7, wherein the processor is further configured to execute the computer-executable instructions to:

obtain at least one textual step description of the instructional video;

match the at least one video segment of the instructional video and the at least one textual step description of the instructional video to the identified at least one step slot; and provide, in response to the user query, the corresponding video segment and the matching textual step description from among the at least one textual step description.

9. The apparatus of claim 7, wherein the processor is further configured to execute the computer-executable instructions to:

obtain a procedure graph indicating an ordered list of a plurality of procedure steps depicted in the instructional video; and generate the temporally-ordered plurality of video segments from the at least one video segment, according to the procedure graph.

10. The apparatus of claim 7, wherein the processor is further configured to execute the computer-executable instructions to:

generate, based on the video features using the transformer model, the plurality of step slots, the transformer model having been acquired by machine learning using a plurality of instructional videos and supervised using automatically generated narrations of the plurality of instructional videos.

11. The apparatus of claim 7, wherein the processor is further configured to execute the computer-executable instructions to:

delete a step slot from the plurality of step slots that fails to match with the plurality of video segments of the instructional video.

12. The apparatus of claim 7, wherein the processor is further configured to execute the computer-executable instructions to:

map the plurality of video segments and the user query into feature vectors in a shared embedding space; and select the corresponding video segment having a first feature vector that minimizes a distance to a second feature vector of the user query as the corresponding video segment corresponding to the requested procedure step.

13. A non-transitory computer-readable storage medium storing computer-executable instructions for performing step discovery and localization in an instructional video that, when executed by at least one processor of a device, cause the device to:

embed video captions to the instructional video and generate video features based on the video captions;

generate, based on the video features using a transformer model, a plurality of step slots by inputting a predetermined number of learnable queries to the transformer model, wherein the number of step slots is equal to the predetermined number of learnable queries;

detect outliers from the plurality of step slots and exclude the outliers to identify at least one step slot remaining from the plurality of step slots, wherein the outliers comprise: (i) duplicate step slots, and (ii) step slots having a binding strength with a plurality of video segments of the instructional video less than a predetermined threshold;

match, using an order-aware sequence-to-sequence alignment model, the identified at least one step slot to at least one video segment among the plurality of video segments of the instructional video by estimating start and end times of the at least one video segment corresponding to the identified at least one step slot;

generate a temporally-ordered plurality of video segments from the at least one video segment, each video segment of the temporally-ordered plurality of video segments having a matching textual step description;

receive a user query requesting a procedure step;

select, from the temporally-ordered plurality of video segments of the instructional video, a corresponding video segment corresponding to the requested procedure step; and provide, in response to the user query, the corresponding video segment and the matching textual step description of the corresponding video segment.

14. The non-transitory computer-readable storage medium of claim 13, wherein the computer-executable instructions, when executed by the at least one processor of the device, further cause the device to:

obtain at least one textual step description of the instructional video;

match the at least one video segment of the instructional video and the at least one textual step description of the instructional video to the identified at least one step slot; and provide, in response to the user query, the corresponding video segment and the matching textual step description from among the at least one textual step description.

15. The non-transitory computer-readable storage medium of claim 13, wherein the computer-executable instructions, when executed by the at least one processor of the device, further cause the device to:

obtain a procedure graph indicating an ordered list of a plurality of procedure steps depicted in the instructional video; and generate the temporally-ordered plurality of video segments from the at least one video segment, according to the procedure graph.

16. The non-transitory computer-readable storage medium of claim 13, wherein the computer-executable instructions, when executed by the at least one processor of the device, further cause the device to:

generate, based on the video features using the transformer model, the plurality of step slots, the transformer model having been acquired by machine learning using a plurality of instructional videos and supervised using automatically generated narrations of the plurality of instructional videos.

17. The non-transitory computer-readable storage medium of claim 13, wherein the computer-executable instructions, when executed by the at least one processor of the device, further cause the device to:

delete a step slot from the plurality of step slots that fails to match with the plurality of video segments of the instructional video.

18. The non-transitory computer-readable storage medium of claim 13, wherein the computer-executable instructions, when executed by the at least one processor of the device, further cause the device to:

map the plurality of video segments and the user query into feature vectors in a shared embedding space; and select the corresponding video segment having a first feature vector that minimizes a distance to a second feature vector of the user query as the corresponding video segment corresponding to the requested procedure step.

* * * * *